US012764140B2

(12) United States Patent
Davraev et al.

(10) Patent No.: US 12,764,140 B2
(45) Date of Patent: Oct. 13, 2026

(54) MALICIOUS SERVICE PROVIDER ACTIVITY DETECTION

(71) Applicant: Microsoft Technology Licensing, LLC, Redmond, WA (US)

(72) Inventors: Daniel Davraev, Or Yehuda (IL); Shalom Shay Shavit, Yehud (IL); Hagai Ran Kestenberg, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 287 days.

(21) Appl. No.: 18/313,592

(22) Filed: May 8, 2023

(65) Prior Publication Data

US 2024/0380767 A1 Nov. 14, 2024

(51) Int. Cl.
*H04L 9/40* (2022.01)

(52) U.S. Cl.
CPC ...... *H04L 63/1425* (2013.01); *H04L 63/1441* (2013.01)

(58) Field of Classification Search
CPC ........................ H04L 63/1425; H04L 63/1441
USPC ............................................................ 726/22
See application file for complete search history.

(56) References Cited

U.S. PATENT DOCUMENTS 7,991,827 B1 8/2011 Whitmore
9,479,518 B1 10/2016 Fang
10,192,052 B1 1/2019 Singh
11,108,621 B1 8/2021 Shirvani
12,341,796 B2 * 6/2025 Techentin ........... H04L 63/1408
2015/0067845 A1 3/2015 Chari
2015/0220735 A1 8/2015 Paithane et al.
2016/0180557 A1 6/2016 Yousaf
2017/0032143 A1 2/2017 Kong et al.
2017/0251013 A1 8/2017 Kirti et al.
2017/0353477 A1 12/2017 Faigon
2018/0189128 A1 7/2018 Qiao et al.

(Continued)

FOREIGN PATENT DOCUMENTS

WO WO-2022100719 A1 * 5/2022 ............. H04L 49/55

OTHER PUBLICATIONS

International Search Report and Written Opinion received for PCT Application No. PCT/US2024/025895, Jul. 5, 2024, 18 pages.

(Continued)

*Primary Examiner* — Lan Dai T Truong
(74) *Attorney, Agent, or Firm* — Ray Quinney & Nebeker P.C.

(57) ABSTRACT

Malicious service provider activity detection is enabled. A first log is obtained. The first log comprises a record of a first control plane operation executed on behalf of a first entity. A service provider associated with the execution of the first control plane operation is identified. The service provider has privileges to execute control plane operations on behalf of the first entity. A first malicious activity score is determined based at least on the service provider. The first malicious activity score is indicative of a degree to which the first control plane operation is anomalous with respect to the first entity. A determination that the first control plane operation potentially corresponds to malicious activity is made based at least on the determined first malicious activity score. Responsive to determining that the first control plane operation potentially corresponds to malicious activity, a security alert is generated.

20 Claims, 7 Drawing Sheets

(56) References Cited

U.S. PATENT DOCUMENTS

| | | | | |
|---|---|---|---|---|
| 2018/0219888 | A1 | 8/2018 | Apostolopoulos | |
| 2018/0262529 | A1 | 9/2018 | Allen | |
| 2019/0098037 | A1 | 3/2019 | Shenoy, Jr. et al. | |
| 2020/0076677 | A1 | 3/2020 | Mermoud et al. | |
| 2020/0110873 | A1* | 4/2020 | Rosendahl | G06F 21/53 |
| 2020/0213338 | A1 | 7/2020 | Lotem | |
| 2020/0285737 | A1 | 9/2020 | Kraus | |
| 2020/0310889 | A1 | 10/2020 | Levin et al. | |
| 2020/0336503 | A1 | 10/2020 | Xu et al. | |
| 2022/0086180 | A1 | 3/2022 | Karpovsky et al. | |
| 2023/0169168 | A1 | 6/2023 | Magen Medina | |
| 2023/0267198 | A1 | 8/2023 | Karpovsky | |
| 2023/0379346 | A1 | 11/2023 | Goldstein | |
| 2024/0195830 | A1* | 6/2024 | Jayaraman | H04L 63/1433 |
| 2024/0214348 | A1* | 6/2024 | Benameur | H04L 63/1425 |
| 2024/0330445 | A1 | 10/2024 | Shavit | |
| 2024/0354402 | A1* | 10/2024 | Alves Vidal De Seabra | H04L 63/1425 |
| 2025/0209164 | A1 | 6/2025 | Magen Medina | |
| 2025/0392600 | A1* | 12/2025 | Kwon | H04L 63/0815 |
| 2026/0073047 | A1 | 3/2026 | Shay | |

OTHER PUBLICATIONS

Wang, et al., "A Unified Trustworthy Environment Establishment Based on Edge Computing in Industrial IoT," IEEE Transactions on Industrial Informatics, IEEE Service Center, New York, NY, US, vol. 16, No. 9, Nov. 21, 2019, pp. 6083-6091.
Non-Final Office Action mailed on Mar. 14, 2025, in U.S. Appl. No. 17/747,366 17 Pages.
Final Office Action mailed on Nov. 25, 2024, in U.S. Appl. No. 17/747,366, 16 pages.
Non-Final Office Action mailed on Apr. 1, 2025, in U.S. Appl. No. 18/332,376 09 Pages.
Non-Final Office Action mailed on May 29, 2024, in U.S. Appl. No. 17/747,366, 11 pages.
International Search Report and Written Opinion received for PCT Application No. PCT/US2024/019324, Jun. 4, 2024, 11 pages.
"International Search Report and Written Opinion Issued in PCT Application No. PCT/US23/019016", Mailed Date: Aug. 9, 2023, 11 Pages.
International Preliminary Report on Patentability (Chapter I) received for PCT Application No. PCT/US2024/025895, Mailed on Nov. 20, 2025, 11 Pages.
International Preliminary Report on Patentability (Chapter I) received for PCT Application No. PCT/US2024/019324, Oct. 9, 2025, 6 pages.
Notice of Allowance mailed on Nov. 28, 2025, in U.S. Appl. No. 17/747,366, 11 Pages.
Notice of Allowance mailed on Aug. 13, 2025, in U.S. Appl. No. 18/332,376, 09 pages.
Final Office Action mailed on Jul. 1, 2025, in U.S. Appl. No. 17/747,366, 18 pages.
Communication under Rule 71(3) Received for European Application No. 23723025.5, mailed on Feb. 5, 2026, 06 pages.
Notice of Allowance mailed on Jan. 21, 2026, in U.S. Appl. No. 18/332,376, 09 Pages.
Decision to grant a European patent pursuant to Article 97(1) Received for European Application No. 23723025.5, mailed on May 15, 2026, 02 pages.
Notice of Allowance mailed on Apr. 9, 2026, in U.S. Appl. No. 17/747,366, 10 pages.
Notice of Allowance mailed on Apr. 28, 2026, in U.S. Appl. No. 18/332,376, 09 Pages.

* cited by examiner

MALICIOUS SERVICE PROVIDER ACTIVITY DETECTION

BACKGROUND

Cloud computing platforms offer higher efficiency, greater flexibility, lower costs, and better performance for applications and services relative to "on-premises" servers and storage. Accordingly, users are shifting away from locally maintaining applications, services, and data and migrating to cloud computing platforms. In some cloud computing platforms, a "cloud provider" provides the infrastructure for a cloud computing platform and a "cloud service provider" supports and manages users' subscriptions to the cloud computing platform. A cloud service provider typically has admin privileges for its customers. This configuration of a cloud computing platform has gained the interest of malicious entities, such as hackers. Hackers attempt to gain access to the systems of cloud service providers in an attempt to steal and/or hold ransom sensitive data or leverage the massive amount of computing resources of the cloud service providers' customers for their own malicious purposes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein enable malicious service provider activity detection. In a first aspect, a first log is obtained. The first log comprises a record of a first control plane operation executed on behalf of a first entity. A service provider associated with the execution of the first control plane operation is identified. The service provider has privileges to execute control plane operations on behalf of the first entity. A first malicious activity score is determined based at least on the service provider. The first malicious activity score is indicative of a degree to which the first control plane operation is anomalous with respect to the first entity. A determination that the first control plane operation potentially corresponds to malicious activity is made based at least on the determined first malicious activity score. Responsive to determining that the first control plane operation potentially corresponds to malicious activity, a security alert is generated.

In a further aspect of the present disclosure, the first control plane operation is mitigated in response to determining the first control plane operation potentially corresponds to malicious activity.

In a further aspect of the present disclosure, a plurality of logs that comprises the first log is obtained. Each obtained log comprises a respective record of a respective control plane operation executed on behalf of the first entity. Logs of the plurality of logs that comprise records of control plane operations executed by a respective cloud application associated with the first entity are identified. A filtered set of logs is generated by removing the identified logs from the plurality of logs. The filtered set of logs comprises the first log.

In a further aspect of the present disclosure, a property set is generated based on the first log and the first malicious activity score is determined based at least on the first property set and the service provider.

In a further aspect of the present disclosure, data indicative of a second control plane operation executed by a cloud application associated with the service provider and on behalf of the first entity is obtained. The second control plane operation is executed prior to the first control plane operation. A second property set is determined based at least on the obtained data. The first malicious activity score is determined based at least on the service provider, the first property set, and the second property set.

In a further aspect of the present disclosure, a second log that comprises a record of a second control plane operation executed by a cloud application associated with the service provider and on behalf of a second entity is obtained. A second malicious activity score indicative of a degree to which the second control plane operation is anomalous with respect to the second entity is determined based at least on the service provider. A determination that the first control plane operation potentially corresponds to malicious activity is made based at least on the first malicious activity score and the second malicious activity score.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
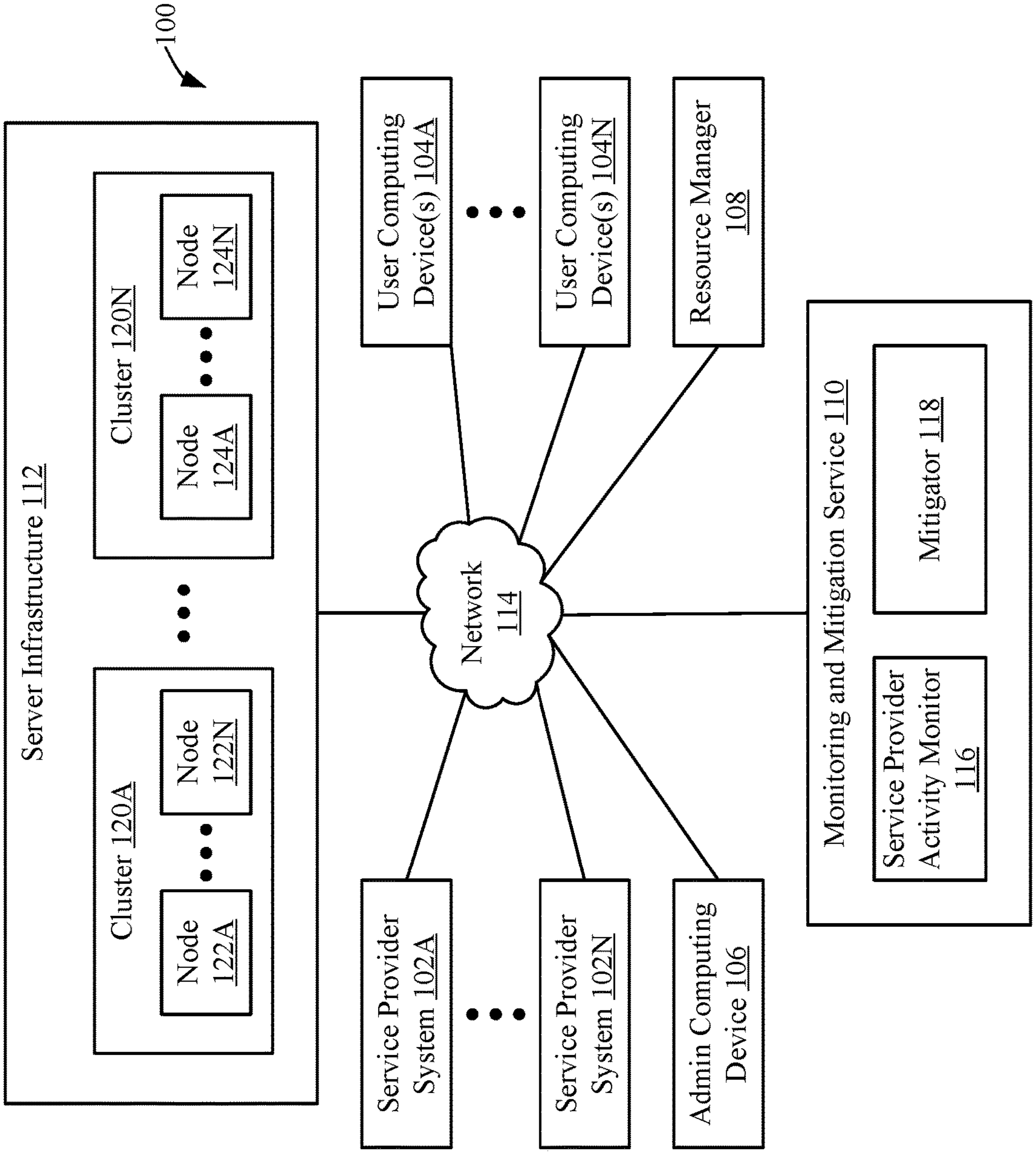
FIG. 1 shows a block diagram of an example network-based computing system that detects malicious service provider activity in a cloud network, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Cloud-based platforms provide various types of services to a variety of users. A cloud provider may implement or otherwise use a centralized mechanism (e.g., Azure® Resource Manager™ in Microsoft® Azure® or CloudTrail® in Amazon Web Services®) to monitor and control the activity of such services. In some implementations of cloud-based platforms, a cloud provider partners with one or more cloud service providers (CSPs). A CSP supports and manages subscriptions to cloud services (e.g., applications and/or resources) on behalf of users and/or tenants of the cloud-based platform. A customer of the CSP (e.g., a user customer, a tenant customer, etc.) provides the CSP with admin privileges to allow the CSP to manage infrastructure and services the customer is subscribed to on behalf of the customer. The CSP may provide such services for many customers. Malicious entities, such as hackers, may attempt to gain access to systems of the CSP in an attempt to gain access to the subscriptions and user accounts of the CSP's customers.

According to embodiments, cloud control plane logs are utilized to identify cases where a CSP is compromised, and malicious execution of control plane operations takes place. Multiple types of control plane operations are taken into account, such as, but not limited to, operations that, when executed, access authentication keys (e.g., list key operations), modify a rule of a firewall, create a rule of a firewall, modify a security rule (e.g., a security alert suppression rule), create a security rule, access a storage (e.g., a secret storage), and/or any other type of control plane operation that, when executed by a CSP on behalf of a user, may otherwise indicate a CSP is compromised.

These and further embodiments described herein are directed to the detection of malicious activity associated with service providers in cloud computing platforms. In accordance with an embodiment, a system and method perform potential malicious activity detection (e.g., threat detection) by detecting control plane operations performed by a service provider (e.g., a CSP) on behalf of a user (e.g., a customer of the CSP) that may be indicative of malicious behavior. For example, if a malicious entity, such as a hacker, compromises an application or computing device associated with a CSP, the malicious entity may perform control plane operations to access sensitive data of the CSP's customers (e.g., to steal the data or to hold the data ransom) and/or leverage subscriptions of the CSP's customers for malicious purposes.

However, control plane operations may be performed by applications and/or systems of a CSP on behalf of a user as part of an intended and authorized operation. Moreover, in a cloud-based system, an extremely large volume of control plane operations (including operations executed by applications and/or systems of a CSP on behalf of a user) may be executed over a relatively short time period. For at least these reasons, it is not trivial to distinguish between malicious and benign executions of control plane operations by applications and/or systems of CSPs on behalf of users. In accordance with an embodiment, a service provider activity monitor leverages logs that comprise (e.g., include) records of the execution of control plane operations in association with a service provider acting on behalf of an entity (e.g., a user or a tenant) in order to determine malicious activity scores indicative of a degree to which a control plane operation is anomalous with respect to the entity. For example, in an aspect of the present disclosure, a log that comprises a record of a first control plane operation executed on behalf of a first entity is obtained. A service provider that is associated with the execution of the first control plane operation is identified. The service provider has privileges to execute control plane operations on behalf of the entity. A first malicious activity score is determined based at least on the service provider, wherein the first malicious activity score is indicative of a degree to which the first control plane operation is anomalous with respect to the entity. A determination that the first control plane operation potentially corresponds to malicious activity is made based at least on the determined malicious activity score. Responsive to the determination that the first control plane operation potentially corresponds to malicious activity, a security alert is generated.

In embodiments, an "entity" may be a user account, a subscription, a tenant, or another entity that is provided services of a cloud computing platform and has authorized a service provider to perform operations (e.g., control plane operations) on behalf of the entity. For instance, a service provider activity monitor in accordance with an embodiment evaluates control plane operations executed by a service provider (e.g., a service provider account) operating on behalf of user accounts associated with the same tenant. In this context, the malicious activity score is indicative of a degree to which the first control plane operation is anomalous with respect to (e.g., all or a portion of) user accounts associated with the tenant. Depending on the implementation, a service provider activity monitor evaluates control plane operations executed by the service provider with respect to an individual user account, a subset of user accounts of a subscription, all user accounts of a subscription, user accounts of a tenant, user accounts of multiple tenants, and/or the like. For instance, in accordance with an embodiment, a service provider activity monitor evaluates control plane operations executed by the same service provider account across multiple tenants.

Embodiments and techniques described herein evaluate a degree to which a control plane operation executed by a service provider on behalf of an entity is anomalous with respect to the entity. For instance, historic activity of an entity (and/or a service provider operating on behalf of the entity) is used to determine whether or not an execution of a control plane operation is anomalous. In this context, potential malicious activity is identified based at least on one or more of: a malicious activity score, an identified service provider acting on behalf of an entity, past activity of the service provider and/or entity, and other information relating to the execution of control plane operations by service providers on behalf of entities, as described herein. By identifying potential malicious activity, embodiments may enable mitigation of malicious activity, thereby reducing unauthorized use of service provider accounts and/or systems to access and/or utilize compute resources, which conserves compute resources and reduces load to the cloud service network.

To help illustrate the aforementioned systems and methods, FIG. 1 will now be described. In particular, FIG. 1 shows a block diagram of an example network-based computing system ("system 100" hereinafter) that detects malicious service provider activity in a cloud network, in accordance with an embodiment. As shown in FIG. 1, system 100 includes one or more service provider systems 102A and 102N (collectively referred to as "service provider systems 102A-102N"), one or more sets of user computing devices 104A and 104N (collectively referred to as "sets of computing devices 104A-104N"), admin computing device 106, resource manager 108, monitoring and mitigation service 110, and server infrastructure 112. Each of service provider systems 102A-102N, sets of computing devices 104A-104N, admin computing device 106, resource manager 108, monitoring and mitigation service 110, and server infrastructure 112 are communicatively coupled to each other via network 114. Network 114 may comprise one or more networks such as local area networks (LANs), wide area networks (WANs), enterprise networks, the Internet, etc., and may include one or more wired and/or wireless portions.

Server infrastructure 112 may be a network-accessible server set (e.g., a cloud-based environment or platform). As shown in FIG. 1, server infrastructure 112 includes clusters 120A and 120N. Each of clusters 120A and 120N may comprise a group of one or more nodes (also referred to as compute nodes) and/or a group of one or more storage nodes. For example, as shown in FIG. 1, cluster 120A includes nodes 122A-122N and cluster 120N includes nodes 124A-124N. Each of nodes 122A-122N and/or 124A-124N are accessible via network 114 (e.g., in a "cloud-based" embodiment) to build, deploy, and manage applications and services. Any of nodes 122A-122N and/or 124A-124N may be a storage node that comprises a plurality of physical storage disks that are accessible via network 114 and is configured to store data associated with the applications and services managed by nodes 122A-122N and/or 124A-124N.

In an embodiment, one or more of clusters 120A and/or 120N may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 120A and/or 120N may be a datacenter in a distributed collection of datacenters. In accordance with an embodiment, system 100 comprises part of the Microsoft® Azure® cloud computing platform, owned by Microsoft Corporation of Redmond, Washington, although this is only an example and not intended to be limiting.

Each of node(s) 122A-122N and 124A-124N may comprise one or more server computers, server systems, and/or computing devices. Each of node(s) 122A-122N and 124A-124N may be configured to execute one or more software applications (or "applications") and/or services and/or manage hardware resources (e.g., processors, memory, etc.), which may be utilized by users (e.g., customers) of the network-accessible server set. Node(s) 122A-122N and 124A-124N may also be configured for specific uses. For example, any of nodes 122A-122N and/or 124A-124N may be configured to execute resource manager 108 and/or monitoring and mitigation service 110 (or one or more components thereof). It is noted that resource manager 108 and/or monitoring and mitigation service 110 may be incorporated as services on a computing device external to cluster 120A and cluster 120N and/or server infrastructure 112.

As shown in FIG. 1, monitoring and mitigation service 110 includes a service provider activity monitor 116 and a mitigator 118. As shown in FIG. 1, service provider activity monitor 116 and mitigator 118 are incorporated as subservices of monitoring and mitigation service 110. Alternatively, service provider activity monitor 116 and mitigator 118 are separate services. Monitoring and mitigation service 110 (or any of service provider activity monitor 116 and/or mitigator 118) may be incorporated as a service executing on a computing device external to server infrastructure 104. Alternatively, monitoring and mitigation service 110 or a subservice thereof may be incorporated as a service executing on a computing device of server infrastructure 112. Furthermore, monitoring and mitigation service 110 (or a subservice thereof) may be incorporated with resource manager 108. As shown in FIG. 1, system 100 includes a monitoring and mitigation service 110; however, it is also contemplated herein that a system may include multiple monitoring and mitigation services. For instance, system 100 in accordance with an embodiment includes a separate monitoring and mitigation service for each cluster of clusters 120A-120N (e.g., respective cluster monitoring and mitigation services).

Service provider systems 102A-102N include any computing systems (e.g., one or more computing devices, enterprise computing systems, networked computing systems, etc.) of service providers (e.g., CSPs), sets of computing devices 104A-104N include any computing devices of users (e.g., individual users, groups of users, subscriptions of users, tenants, etc.), and admin computing device 106 includes any computing device of an admin user (e.g., a cloud provider service team user, a cloud provider developer user, a cloud provider account management user, etc.) of the cloud provider. Computing devices of service provider systems 102A-102N, computing devices of sets of computing devices 104A-104N, and/or admin computing device 106 may access network accessible-resources of server infrastructure 112 over network 114. System 100 may include fewer or greater numbers of admin computing devices, sets of (e.g., user) computing devices, and/or server provider systems than depicted in FIG. 1. Computing devices of service provider systems 102A-102N, computing devices of sets of computing devices 104A-104N, and/or admin computing device 106 may each be any type of stationary or mobile processing device, including, but not limited to, a desktop computer, a server, a mobile or handheld device (e.g., a tablet, a personal data assistant (PDA), a smart phone, a laptop, etc.), an Internet-of-Things (IoT) device, etc. Each of computing devices of service provider systems 102A-102N, computing devices of sets of computing devices 104A-104N, and admin computing device 106 store data and execute computer programs, applications, and/or services.

For example, each of service provider systems 102A-102N and/or sets of computing devices 104A-104N may include various services (not shown in FIG. 1) that enable the execution of control plane operations that utilize and/or interact with network-accessible resources. Admin computing device 106 may include various services (not shown in FIG. 1) that enable the management of server infrastructure 112, the authorization of service providers, the review of security alerts generated by monitoring and mitigation service 110, and/or other operations associated with the administration of the cloud computing platform of system 100.

Depending on the implementation, the computing devices in a particular set of sets of computing devices 104A-104N correspond to at least one of the same user, the same group of users, the same subscription, and/or the same tenant. As a non-limiting example, set of user computing devices 104A includes a single computing device associated with an individual user and set of user computing devices 104N includes computing devices of users associated with a tenant (e.g., work computers and/or work mobile devices of employees of an organization tenant).

Users are enabled to authorize service providers associated with service provider systems 102A-102N to utilize applications and/or services (e.g., resource manager 108 and/or monitoring and mitigation service 110) offered by the network-accessible server set on their behalf via sets of computing device 104A-104N. For example, a user may sign-up for a cloud services subscription with a service provider associated with service provider system 102A that authorizes the service provider to utilize applications and/or services of the network-accessible server set on behalf of the user. In accordance with an embodiment, the user authorizes the service provider to utilize applications and/or services the user has previously signed up for with a cloud provider of the network-accessible server set. Alternatively, the user is assigned and/or subscribed to services as part of signing up with the service provider. Upon signing up, the service provider is provided admin privileges with respect to the user's account with the cloud provider.

In accordance with an embodiment, the service provider of service provider system 102A may authenticate with the cloud provider of the network-accessible server set to indicate the user has granted the service provider admin privileges of the user account. For example, the service provider may have access to a portal of server infrastructure 112, not shown in FIG. 1. Subsequent to the user signing up with the service provider, the service provider may access the portal via service provider system 102A (e.g., by a browser application executing thereon). For example, a service provider user may use a browser executing on a computing device of service provider system 102A to traverse a network address (e.g., a uniform resource locator) to a portal of server infrastructure 112, which invokes a user interface (e.g., a web page) in a browser window rendered on the computing device. The service provider user may be authenticated (e.g., by requiring the service provider user to enter service provider user credentials (e.g., a username, password, PIN, etc.)) before being given access to the portal.

Upon being authenticated, the service provider user may utilize the portal to indicate that the (e.g., customer) user authorized the service provider to utilize applications and/or services of the network-accessible server set on behalf of the user. The portal may request the service provider provides proof of the authorization (e.g., by requiring the service provider user to enter an admin credential of the user (e.g., a username, password, PIN, etc.)) before authorizing use of the portal on behalf of the user. In this manner, the service provider is authorized to access the portal on behalf of the user.

Upon authorization, the service provider (or the service provider user on behalf of the service provider) may utilize the portal to perform various cloud management-related operations (also referred to as "control plane" operations). Such operations include, but are not limited to, creating, deploying, allocating, modifying, and/or deallocating (e.g., cloud-based) compute resources; building, managing, monitoring, and/or launching applications (e.g., ranging from simple web applications to complex cloud-based applications); configuring one or more of node(s) 122A-122N and 124A-124N to operate as a particular server (e.g., a database server, OLAP (Online Analytical Processing) server, etc.); etc. Examples of compute resources include, but are not limited to, virtual machines, virtual machine scale sets, clusters, ML workspaces, serverless functions, storage disks (e.g., maintained by storage node(s) of server infrastructure 112), web applications, database servers, data objects (e.g., data file(s), table(s), structured data, unstructured data, etc.) stored via the database servers, etc. The portal may be configured in any manner, including being configured with any combination of text entry, for example, via a command line interface (CLI), one or more graphical user interface (GUI) controls, etc., to enable user interaction.

Resource manager 112 may be configured to generate a log (also referred to as an "activity log") each time a user or service provider logs into a cloud service subscription via the portal. The log may be stored in one or more storage nodes of server infrastructure 112 and/or in a data storage external to server infrastructure 112. The period in which a user or service provider has logged into and logged off from the portal may be referred to as a portal session. Each log may comprise a record of a control plane operation that was executed during a given portal session, along with other characteristics associated with the control plane operation. For example, each log may comprise a record that specifies an identifier for the control plane operation; an indication as to whether the control plane operation was successful or unsuccessful; information about the resource that is created, deployed, and/or accessed, or was attempted to be created, deployed, and/or accessed (e.g., an identifier of the resource ("resource ID"), the name of the resource, the type of resource, the group the resource is associated with (e.g., if the resource was created as part of a group of created resources, if the resource was assigned to a group of resources, etc.)); a time stamp indicating a time at which the control plane operation was issued; a time stamp of the portal session in which the control plane operation was issued; a network address from which the control plane operation was issued (e.g., the network address associated with a computing device of service provider systems 102A-102N, sets of computing devices 104A-104N, and/or admin computing device 106); an application identifier that identifies an application (e.g., the portal or a browser application) from which the control plane operation was issued; a username associated with a user (e.g., a username by which the user logged into the portal) that the control plane operation was issued by or on behalf of; an identifier of a service provider that issued the control plane operation on behalf of a user; other identifying information of the user and/or service provider (e.g., an e-mail address of the user and/or service provider, the name of the user and/or service provider, a domain of the user and/or service provider (e.g., whether the user is internal or external to an organization or the service provider)); an identifier of the cloud-based subscription from which the resource was created, deployed, and/or accessed or attempted to be created, deployed, and/or accessed; whether the control plane operation was issued by a user, a service provider, a role, or a service principal; an identifier of the tenant that the subscription is associated with; a type of authentication scheme (e.g., password-based authentication, certificate-based authentication, biometric authentication, token-based authentication, multi-factor authentication, etc.) utilized by the user (or, service provider, role, service principal, or other issuer) that issued the control plane operation; a network address the issuer (e.g., a user, a service provider, a role, a service principal, etc.) authenticated from; an autonomous system number (ASN) associated with the issuer that issued the control plane operation (e.g., a globally unique identifier that defines a group of one or more Internet protocol (IP) prefixes utilized by a network operator that maintains a defined routing policy); a geographic location of the computing device that issued the control plane operation; a level of authorization of the issuer (e.g., permissions the issuer is granted, privileges the issuer is granted, security groups the issuer is associated with, etc.); etc. Furthermore, logs created by resource manager 108 may comprise additional metrics suitable for reporting and/or recording for review by other services, sub-systems, administrators, and/or users of a cloud-based network. An example of resource manager 108 includes, but is not limited to, Azure® Resource Manager™ owned by Microsoft® Corporation, although this is only an example and is not intended to be limiting.

As stated above, monitoring and mitigation service 110 comprises service provider activity monitor 116 and mitigator 118. Service provider activity monitor 116 detects malicious activity of service providers for cloud computing platforms. In accordance with an embodiment, service provider activity monitor 116 analyzes logs comprising records of executions of control plane operations and determine whether such records are indicative of malicious activity. In accordance with an embodiment, service provider activity monitor 116 detects attempts and/or executions of control plane operations that occur in a particular time period or window. It is noted that service provider activity monitor 116 may be configured to analyze certain types of control plane operations (and not all control plane operations). For instance, service provider activity monitor 116 in accordance with an embodiment analyzes control plane operations executed by a service provider on behalf of an entity. In accordance with an embodiment, service provider activity monitor 116 is implemented in and/or incorporated with Microsoft® Defender for Cloud™ published by Microsoft® Corp, or Microsoft® Sentinel™ published by Microsoft® Corp., etc. Responsive to determining that a control plane operation potentially corresponds to malicious activity, service provider activity monitor 116 generates a security alert.

In embodiments, service provider activity monitor 116 analyzes a control plane operation with respect to additional information to determine if the control plane operation potentially corresponds to malicious activity. For instance, as described with respect to FIGS. 2-4, 8, 9, and 12, service provider activity monitor 116 analyzes a first control plane operation executed on behalf of an entity (e.g., by a service provider). In accordance with an embodiment, and as described with respect to FIG. 6, service provider activity monitor 116 analyzes a plurality of control plane operations executed on behalf of an entity. In accordance with an embodiment, and as described with respect to FIG. 7, service provider activity monitor 116 analyzes control plane operations executed by the same service provider on behalf of respective entities of a plurality of entities. In accordance with an embodiment, and as described with respect to FIGS. 8-11, service provider activity monitor 116 generates property sets based on logs. In accordance with an embodiment, and as described with respect to FIGS. 10 and 11, service provider activity monitor 116 analyzes a first control plane operation with respect to data indicative of control plane operations previously executed on behalf of the entity. In accordance with a further embodiment, service provider activity monitor 116 analyzes control plane operations executed by a service provider on behalf of an entity that are more likely to be representative of malicious behavior (e.g., impactful operations, as described elsewhere herein).

Mitigator 118 mitigates a control plane operation in response to service provider activity monitor 116 determining that the control plane operation is potentially associated with malicious activity. In this manner, mitigator 118 mitigates threats to a cloud computing platform based on determinations made by service provider activity monitor 116. Depending on the implementation, mitigator 118 may mitigate a control plane operation automatically, cause another service (e.g., resource manager 108, monitoring and mitigation service 110, service provider activity monitor 116, and/or another service of system 100) to mitigate the control plane operation, or cause another component of system 100 to mitigate the control plane operation. Alternatively, control plane operations are manually mitigated (e.g., by a service provider of service provider systems 102A-102N, by a user of a computing device of sets of computing devices 104A-104N, by an administrator of admin computing device 106, and/or the like). In some embodiments, a combination of automatic and manual mitigation techniques is used to mitigate control plane operations. In accordance with an embodiment, mitigator 118 is implemented in and/or incorporated with Microsoft® Defender for Cloud™ published by Microsoft® Corp, or Microsoft® Sentinel™ published by Microsoft® Corp., etc.

Mitigator 118 may mitigate a control plane operation by transmitting a message to a computing device of a user corresponding to an account associated with the execution of the control plane operation, transmitting a message to a computing device of a service provider corresponding to the service provider account associated with the execution of the control plane operation, removing or deallocating compute resources created by the control plane operation, reverting changes made by the control plane operation (e.g., rolling back changes), remediating a compromised service provider account (e.g., reviewing credentials related to the account, reviewing activities performed by a service principal associated with the account (e.g., by reviewing activity logs), and/or identifying suspicious activities), remediating comprised resources and/or subscription (e.g., changing credentials associated with the resources and/or subscriptions, reviewing identity and access management permissions, removing permissions of unfamiliar (e.g., malicious or anomalous) user account(s) and/or service provider account(s), reviewing alerts in a firewall or other antivirus program related to the resources and/or subscriptions, evaluate alerts associated with the resources and/or subscriptions, and/or review activities performed in compromised resources and/or subscriptions (e.g., by reviewing activity logs) and identifying suspicious activities), and/or any other mitigating steps described elsewhere herein, or as would be understood by a person of skill in the relevant art(s) having benefit of this disclosure. As a non-limiting example, suppose service provider activity monitor 116 determined a list key operation used to retrieve keys of customer user accounts of a service provider potentially corresponded to malicious activity. In this example, mitigator 118 reviews activities performed by the service provider account that issued the list key operation, removes permissions granted to the service provider account, change the access keys for the respective customer user accounts (e.g., by rotating access keys), transmits an alert to an administrator associated with the service provider system that the service provider account was associated with, and transmits alerts to the customer users of the customer user accounts.

Figure 2:
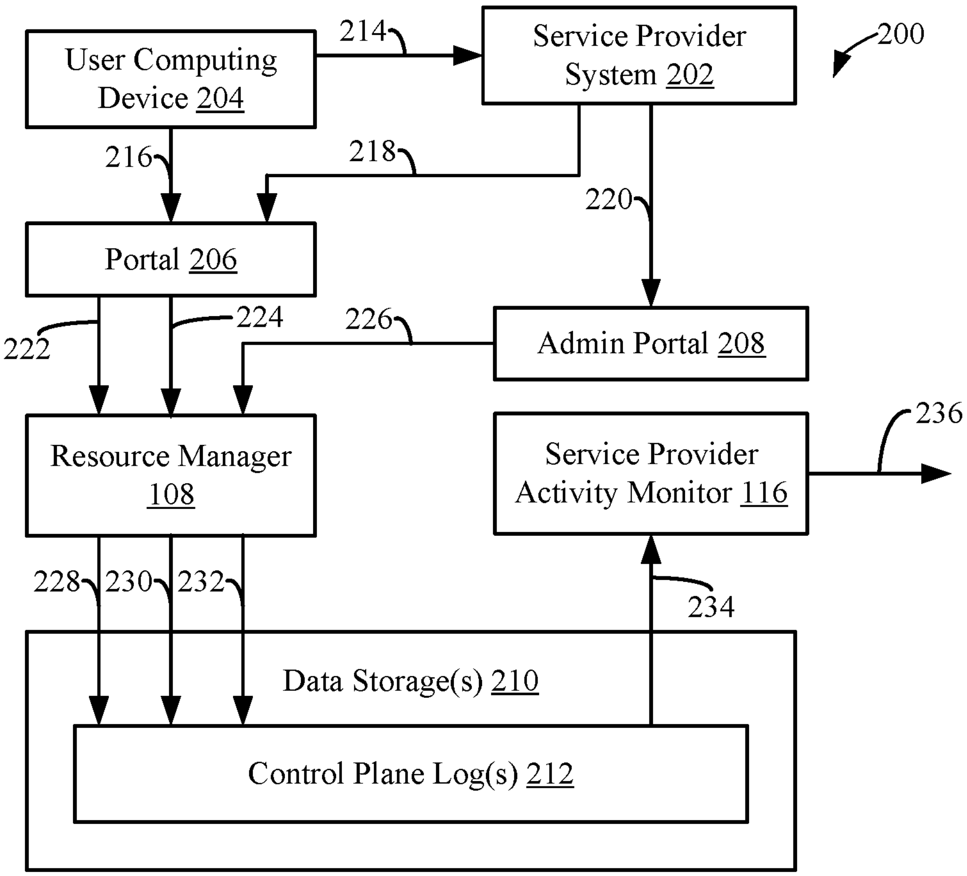
FIG. 2 shows a block diagram of a system in which a resource manager generates and store logs and a service provider activity monitor accesses the stored logs, in accordance with an embodiment.

To help further illustrate the features of malicious activity detector 112 in accordance with embodiments, FIG. 2 will now be described. In particular, FIG. 2 shows a block diagram of a system 200 in which a resource manager generates and store logs and a service provider activity monitor accesses the stored logs, in accordance with an embodiment. As shown in FIG. 2, system 200 includes: resource manager 108 and service provider activity monitor 116, as described with respect to FIG. 1; and a service provider system 202, a user computing device 204, a portal 206, an admin portal 208, and data storage(s) 210 ("data storage 210" hereinafter). Service provider system 202 is an example of service provider systems 102A-102N and user computing device 204 is an example of a computing device of sets of computing devices 104A-104N, as respectively described with respect to FIG. 1. Portal 206 and admin portal 208 are examples of portals that users and/or service providers may utilize to perform control plane operations with respect to applications and/or services of the network-accessible server set, as described above with respect to FIG. 1. In accordance with an embodiment, admin portal 208 enables an issuer to issue control plane operations on behalf of another entity. For instance, as shown in FIG. 2, admin portal 208 enables service provider system 202 to issue control plane operations on behalf of user computing device 204. As shown in FIG. 2, resource manager 108, service provider activity monitor 116, portal 206, and admin portal 208 are separate services; however, it is also contemplated that one or more of resource manager 108, service provider activity monitor 116, portal 206, and admin portal 208 may be incorporated in the same service.

Data storage 210 stores one or more log(s) 212 ("logs 212" hereinafter) and/or any other information described herein. As shown in FIG. 2, data storage 210 is external to resource manager 108 and service provider activity monitor 116; however, it is also contemplated that all or a portion of data storage 210 may be internal to a computing device executing either of resource manager 108 and/or service provider activity monitor 116. Furthermore, data storage 210 may be included in a storage node of clusters 120A and/or 120N of FIG. 1, or in a storage device external to server infrastructure 112 of FIG. 1.

As described above, data storage 210 stores logs 212. Logs 212 comprise records of control plane operations executed by a cloud application associated with an entity and/or a service provider operating on behalf of the entity.

A user of user computing device 204 ("User A") authorizes a service provider of service provider system 202 ("CSP B") to utilize applications and/or services of a network-accessible service set on behalf of User A. For instance, as shown in FIG. 2, user computing device 204 transmits an authorization signal 214 to service provider system 202. Authorization signal 214 may include an indication of the types of control plane operations CSP B is authorized to perform, admin credentials CSP B is authorized to use, and/or any other information related to the process of User A authorizing CSP B to perform operations on behalf of User A. For instance, authorization signal 214 may include an authentication token that authenticates the identity of User A to CSP B.

As further shown in FIG. 2, user computing device 204 is able to access portal 206 to issue control plane operations. For instance, user computing device 204 transmits an operation request 216 to portal 206 (e.g., by network 114) that includes a request to issue a control plane operation. In accordance with an embodiment, portal 206 requires User A to authenticate (e.g., by providing credentials or an authentication token) before operation request 216 is authorized. If operation request 216 is authorized, the control plane operation is executed and portal 206 provides information 222 related to the execution of the control plane operation to resource manager 108. Information 222 may include any information associated with the execution of the control plane operation, operation request 216, User A, the session the control plane operation was executed in, and/or any other information suitable for reporting to resource manager 108.

Resource manager 108 receives information 222 from portal 206 (e.g., by network 114) and generates log 228. Resource manager 110 stores log 228 in logs 212 in data storage 210. In accordance with an embodiment, resource manager 108 receives information 222 for a portal session of User A and generates log 228 associated with the portal session. As described above, log 228 comprises a record of a control plane operation that was executed during the given portal session (e.g., the control plane operation requested in operation request 216), along with other details associated with the control plane operation and/or portal session.

As also shown in FIG. 2, service provider system 202 is able to access portal 206 to issue control plane operations. For instance, service provider system 202 transmits an operation request 218 to portal 206 (e.g., by network 114) that includes a request to issue a control plane operation. In accordance with an embodiment, portal 206 requires CSP B to authenticate (e.g., by providing credentials or an authentication token) before operation request 218 is authorized. In accordance with an embodiment, portal 206 restricts the type of control plane operations that CSP B may perform with respect to applications and/or resources on behalf of an entity (e.g., User A). For instance, in a non-limiting example, portal 206 restricts the type of control plane operations performable by CSP B on behalf of User A to control plane operations that do not require admin privileges.

If operation request 218 is authorized, the control plane operation is executed and portal 206 provides information 224 related to the execution of the control plane operation to resource manager 108. Information 224 may include any information associated with the execution of the control plane operation, operation request 218, CSP B, the service provider account that issued the control plane operation (e.g., an account of a service provider user operating on behalf of CSP B), the session the control plane operation was executed in, and/or any other information suitable for reporting to resource manager 108.

Resource manager 108 receives information 224 from portal 206 (e.g., by network 114) and generates log 230. Resource manager 110 stores log 230 in logs 212 in data storage 210. In accordance with an embodiment, resource manager 108 receives information 224 for a portal session of CSP B and generates log 230 associated with the portal session. As described above, log 230 comprises a record of a control plane operation that was executed during the given portal session (e.g., the control plane operation requested in operation request 218), along with other details associated with the control plane operation and/or portal session.

As also shown in FIG. 2, service provider system 202 is able to access admin portal 208 to issue control plane operations. For instance, service provider system 202 transmits an operation request 220 to admin portal 208 (e.g., by network 114) that includes a request to issue a control plane operation. In accordance with an embodiment, admin portal 208 requires CSP B to authenticate (e.g., by providing credentials or an authentication token) and prove authorization by User A to perform operations on behalf of User A (e.g., prove CSP B has admin privileges) before operation request 220 is authorized. If operation request 220 is authorized, the control plane operation is executed and admin portal 208 provides information 226 related to the execution of the control plane operation to resource manager 108. Information 226 may include any information associated with the execution of the control plane operation, operation request 220, CSP B, the service provider account that issued the control plane operation (e.g., an account of a service provider user operating on behalf of CSP B), the admin privileges granted to CSP B by User A, the session the control plane operation was executed in, and/or any other information suitable for reporting to resource manager 108.

Resource manager 108 receives information 226 from admin portal 208 (e.g., by network 114) and generates log 232. Resource manager 110 stores log 232 in logs 212 in data storage 210. In accordance with an embodiment, resource manager 108 receives information 226 for a portal session of CSP B and generates log 232 associated with the portal session. As described above, log 232 comprises a record of a control plane operation that was executed during the given portal session (e.g., the control plane operation requested in operation request 220), along with other details associated with the control plane operation and/or portal session.

As shown in FIG. 2, service provider activity monitor 116 accesses one or more stored log(s) 234 of logs 204 ("logs 234" hereinafter), determines if a control plane operation that was executed and recorded in logs 234 potentially corresponds to malicious activity, and if it is determined that the control plane operation potentially corresponds to malicious activity, generates a security alert 236. In accordance with an embodiment, and as discussed further with respect to FIGS. 3 and 4, service provider activity monitor 116 identifies a service provider associated with the execution of the control plane operation based on logs 234 (e.g., CSP B), determines a malicious activity score indicative of a degree to which the control plane operation is anomalous with respect to the entity (e.g., User A) based at least on the service provider, determines that the control plane operation potentially corresponds to malicious activity based at least on the determined malicious activity score, and responsive to the determination that the control plane operation potentially corresponds to malicious activity, generates security alert 236. In accordance with a further embodiment, and as described with respect to FIG. 6, service provider activity monitor 116 analyzes a plurality of control plane operations recorded in logs 234 and executed on behalf of an entity (e.g., User A). In accordance with another embodiment, and as described with respect to FIG. 7, logs 234 comprise logs associated with multiple entities (e.g., including User A) and service provider activity monitor 116 analyzes control plane operations recorded in logs 234 and executed by the same service provider on behalf of respective entities of the multiple entities. In accordance with an embodiment, and as described with respect to FIGS. 8-11, service provider activity monitor 116 generates property sets based on logs 234 and determines a malicious activity score based on the generated property set(s). In accordance with an embodiment, and as described with respect to FIGS. 10 and 11, service provider activity monitor 116 analyzes data indicative of control plane operations previously executed on behalf of the entity. In accordance with a further embodiment, service provider activity monitor 116 analyzes control plane operations executed by a service provider on behalf of an entity that are more likely to be representative of malicious behavior (e.g., impactful operations, as described elsewhere herein).

Figure 3:
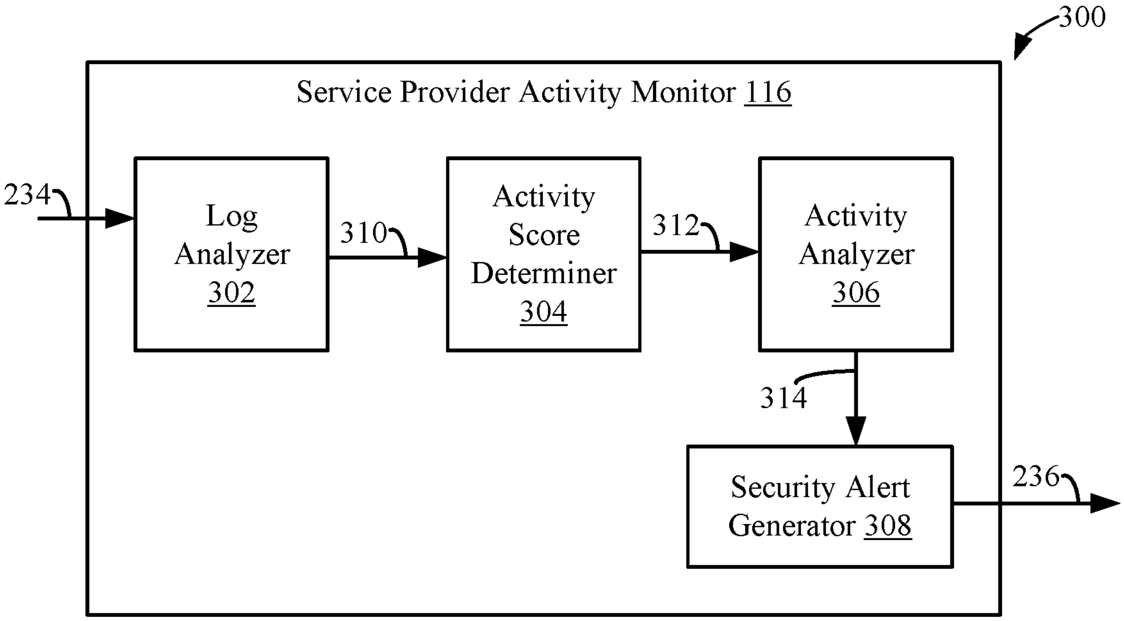
FIG. 3 shows a block diagram of the service provider activity monitor of FIG. 1, in accordance with an embodiment.

Service provider activity monitor 116 may detect potential malicious activity of service providers for cloud computing platforms in various ways, in embodiments. For example, FIG. 3 shows a block diagram 300 of service provider activity monitor 116 of FIG. 1, in accordance with an embodiment. As shown in FIG. 3, service provider activity monitor 116 includes a log analyzer 302, an activity score determiner 304, an activity analyzer 306, and a security alert generator 308. Depending on the implementation, each of a log analyzer 302, an activity score determiner 304, an activity analyzer 306, and a security alert generator 308 may be implemented as services executing on the same computing device. Alternatively, any of the components of service provider activity monitor 116 may be executed on separate computing devices configured to communicate with each other over a network (e.g., network 114, an internal network of server infrastructure 112, and/or the like).

Figure 4:
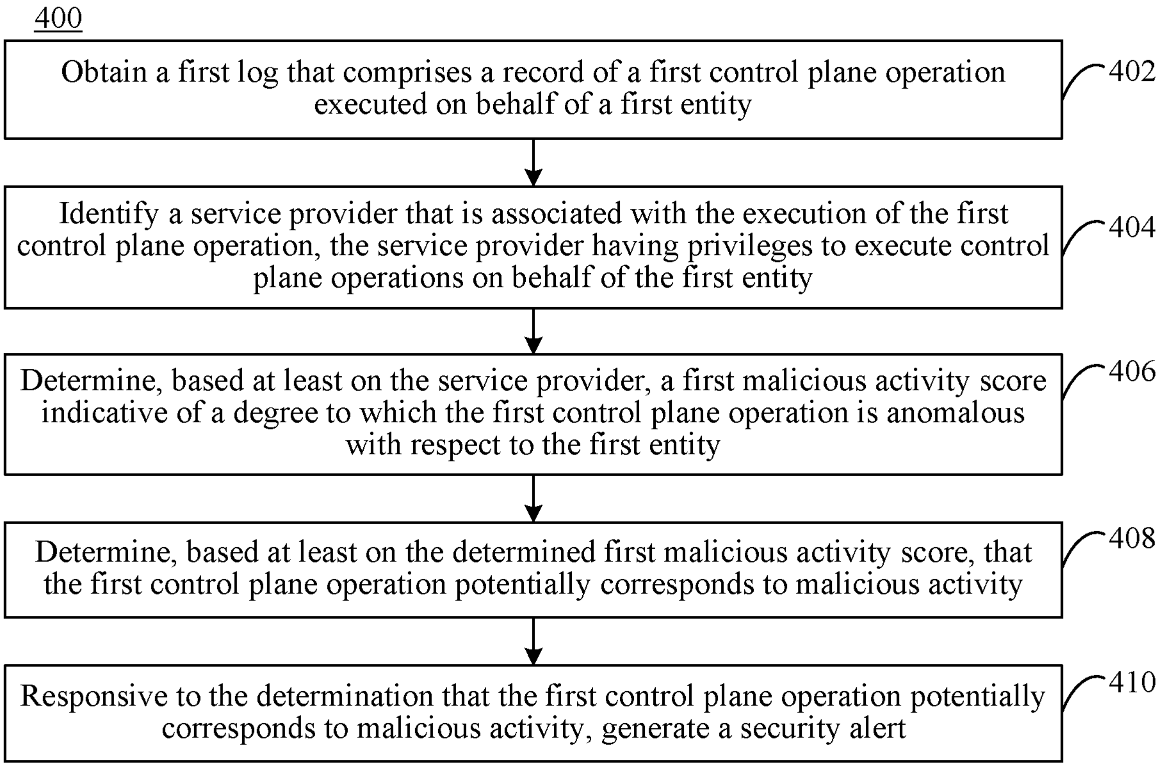
FIG. 4 shows a flowchart of a process for detecting malicious service provider activity, in accordance with an embodiment.

For illustrative purposes, service provider activity monitor 116 of FIG. 3 is described with respect to FIG. 4. FIG. 4 shows a flowchart 400 of a process for detecting malicious service provider activity, in accordance with an embodiment. Service provider activity monitor 116 may operate according to flowchart 400 in embodiments. Note that not all steps of flowchart 400 need be performed in all embodiments. Further structural and operational embodiments will be apparent to persons skilled in the relevant art(s) based on the following descriptions of FIGS. 3 and 4.

Flowchart 400 begins with step 402. In step 402, a first log is obtained. The first log comprises a record of a first control plane operation executed on behalf of a first entity. For example, as shown in FIG. 3, log analyzer 302 of FIG. 3 obtains logs 234 by accessing logs 212 stored in data storage 210, as described with respect to FIG. 2. Alternatively, logs 234 may be streamed to log analyzer 302 (e.g., by resource manager 108 of FIG. 1). Log analyzer 302 may obtain logs periodically (e.g., every hour, every two hours, at a particular (e.g., scheduled) time in the day), in response to a query (not shown in FIG. 3) received from a computing device (e.g., a computing device of service provider systems 102A-102N, a computing device of sets of computing devices 104A-104N, and/or admin computing device 106 of FIG. 1, a computing device of service provider system 202 and/or user computing device 204 of FIG. 2, and/or the like) on behalf of a user (e.g., a customer user, an individual user, an administrator user, a service team user, a service provider user, etc.), in response to a query received from an application executing on a computing device, and/or the like. In some embodiments, log analyzer 302 obtains a single log at a time. Alternatively, and as shown in FIG. 3, log analyzer 302 obtains multiple logs at once (e.g., multiple logs of control plane logs 212).

In step 404, a service provider that is associated with the execution of the first control plane operation is identified. The service provider has privileges to execute control plane operations on behalf of the first entity. For instance, log analyzer 302 of FIG. 3 identifies a service provider that is associated with the execution of a control plane operation recorded in a log of logs 234. As a non-limiting running example, suppose logs 234 comprises log 232. As described with respect to FIG. 2, log 232 comprises a record of the execution of a control plane operation requested by CSP B of service provider system 202 ("Operation C" hereinafter). In this context, log analyzer 302 identifies CSP B based on information included in log 232. Examples of such information include, but are not limited to, a service provider identifier (ID) that uniquely identifies CSP B, an service principal ID that uniquely identifies a service principal associated with CSP B, an IP address of a computing device associated with CSP B that issued operation request 220, a user ID that uniquely identifies a user associated with CSP B (e.g., an employee of CSP B, a user authorized by CSP B to request control plane operations) log 232 comprises an identifier of CSP B (i.e., a "service provider identifier (ID)"), and/or any other information or data that is suitable for identifying CSP B.

As shown in FIG. 3, log analyzer 302 transmits analysis result 310 to activity score determiner 304. Analysis result 310 includes the service provider identified by log analyzer 302. For instance, analysis result 310 in accordance with an embodiment includes the name of the identified service provider (e.g., CSP B). Alternatively, analysis result 310 includes an identifier that uniquely identifies the provider (e.g., a service provider ID). Depending on the implementation, analysis result 310 may include additional information associated with logs 234 based on analysis thereof, including, but not limited to, an entity ID that uniquely identifies the entity the first control plane operation was executed on behalf of, an application ID associated with the execution of the control plane operation, the type of control operation, the time the control plane operation was executed, a session ID of the portal session the control plane operation was executed in, additional control plane operations executed (e.g., recorded in log 232, recorded in other logs of logs 234, etc.), and/or any other information associated with the execution of the first control plane operation.

In step 406, a first malicious activity score is determined based at least on the service provider. The first malicious activity score is indicative of a degree to which the first control plane operation is anomalous with respect to the first entity. For instance, activity score determiner 304 of FIG. 3 determines a malicious activity score 312 based at least on the service provider identified by log analyzer 302 (e.g., included in analysis result 310). Malicious activity score 312 is indicative of a degree to which the first control plane operation (e.g., associated with analysis result 310) is anomalous with respect to the entity. For instance, referring again to the running example described above with respect to step 404, activity score determiner 304 determines malicious activity score 312 based at least on CSP B identified in log 232 executing Operation C on behalf of User A.

In embodiments, activity score determiner 304 evaluates the identified service provider and the first control plane operation in order to determine malicious activity score 312. For instance, with respect to the running example described above, activity score determiner 304 may evaluate the identified service provider to determine recent activity of the service provider (e.g., control plane operations recently issued by the service provider or on behalf of the service provider), historic activity of the service provider (e.g., historic control plane operations issued by the service provider or on behalf of the service provider), service principals associated with the service provider, applications associated with the service provider, computing devices associated with the service provider (e.g., computing devices of service provider system 202 of FIG. 2), user IDs of users authorized to operate on behalf of the service provider, regions the service provider operates in, other entities that service provider is authorized to issue control plane operations on behalf of (e.g., other customers of the service provider), and/or any other information associated with the service provider ("service provider information"). In accordance with one or more embodiments, activity score determiner 304 determines malicious activity score 312 based on the execution of the first control plane operation with respect to the service provider information.

For instance, in accordance with an embodiment, activity score determiner 304 compares the execution of the first control plane operation to typical activity of the service provider (e.g., with respect to the entity, with respect to other entities serviced by the service provider, or with respect to all entities serviced by the service provider). In this context, malicious activity score 312 represents a rating of how anomalous the first control plane operation is compared to typical (e.g., historical, trending, and/or the like) activity of the service provider on behalf of customers of the service provider. For example, and as discussed further with respect to FIGS. 10 and 11 (as well as elsewhere herein), activity score determiner 304 may determine malicious activity score 312 by evaluating the execution of the first control plane operation with respect to control plane operations the service provider has executed previously on behalf of the first entity.

Activity score determiner 304 may evaluate any properties of the first control plane operation with respect to the identified service provider to determine malicious activity score 312. For instance, and as discussed further with respect to FIGS. 8-11 (as well as elsewhere herein), activity score determiner 304 may generate a property set based on a log and evaluate the property set with respect to the service provider to determine malicious activity score 312.

In accordance with an embodiment, activity score determiner 304 determines malicious activity score 312 using a machine learning (ML) model. Activity score determiner 304 may include the ML model or transmit data to an external ML model to determine malicious activity score 312 on behalf of activity score determiner 304. In this context, information included in analysis result 310 (e.g., the service provider, properties of the control plane operation, etc.) is provided to a ML model that generates malicious activity score 312. In accordance with an embodiment, the ML model is a multivariate anomaly detection model. In a further embodiment, the ML model outputs explainability scores that correspond to a portion of the information included in analysis result 310 provided to the model (e.g., the type of service provider, the ID of the service provider, a property of the control plane operation, etc.) and indicates a weight of that portion of information in determining malicious activity score 312.

In some embodiments, activity score determiner 304 determines multiple malicious activity scores. For instance, activity score determiner 304 may determine a first malicious activity score indicative of a degree to which the first control plane operation is anomalous with respect to an average activity of the entity (e.g., the average executions of a particular type of control plane operation in a given first period of time (e.g., an hour, a day) over a second period of time (a week, a month, etc.)), a second malicious activity score indicative of a degree to which the first control plane operation is anomalous with respect to a maximum activity of the entity (e.g., the most executions of a particular type of control operation in a given period of time (e.g., in a day, a week, a month, etc.)), and a third malicious activity score indicative of a degree to which the first control plane operation is anomalous with respect to (e.g., average activity of, maximum activity of, etc.) the service provider (e.g., with respect to all entities (e.g., customers) associated with the service provider).

In step 408, a determination that the first control plane operation potentially corresponds to malicious activity is made based at least on the determined first malicious activity score. For instance, activity analyzer 306 determines that the first control plane operation potentially corresponds to malicious activity based at least on malicious activity score 312. For example, activity analyzer 306 in accordance with an embodiment determines that the first control plane operation potentially corresponds to malicious activity if malicious activity score 312 is greater than an alert threshold. In accordance with an embodiment, different alert thresholds are used depending on the type of control plane operation, the application that issued the control plane operation, the service provider associated with the application, and/or the portal used to issue the control plane operation (e.g., portal 206 or admin portal 208). Alert thresholds may be set by the cloud provider, the service provider, a tenant of the cloud service, a subscription of the cloud service, a user of the cloud service, an administrator, or a service team user. In some embodiments, alert thresholds are dynamically adjusted depending on certain factors (e.g., control plane operation type, surrounding operations, the issuer of the control plane operation (e.g., the type of user, the type of service principal, etc.), type of device that issued the control plane operation, type of authentication used by the issuer, the frequency of control plane operations, etc.).

As shown in FIG. 3, activity analyzer 306 generates indication 314 and provides indication 314 to security alert generator 308. In accordance with an embodiment, indication 314 includes a determination result indicating that the first control plane operation potentially corresponds to malicious activity as well as the determined malicious activity score (e.g., malicious activity score 312). Alternatively, indication 314 is a (e.g., binary) indication that the first control plane operation potentially corresponds to malicious activity.

As discussed above with respect to step 406, activity score determiner 304 may determine multiple malicious activity scores with respect to the first control plane operation. For instance, a first malicious activity score indicative of a degree to which the first control plane operation is anomalous with respect to an average activity of the entity, a second malicious activity score indicative of a degree to which the first control plane operation is anomalous with respect to a maximum activity of the entity, and a third malicious activity score indicative of a degree to which the first control plane operation is anomalous with respect to the service provider. In this context, activity analyzer 306 may determine if the first control plane operation potentially corresponds to malicious activity based on an analysis of two or more of the malicious activity scores. For instance, suppose the first malicious activity score indicates that the first control plane operation is anomalous with respect to an average activity of the entity, but the second malicious activity score indicates that the first control plane operation is not anomalous with respect to maximum activity of the entity and the third malicious activity score indicates that the first control plane operation is not anomalous with respect to the service provider. As a non-limiting example, service providers may perform various control plane operations to set up resources on behalf of an entity. This spike in activity may appear anomalous with respect to the first malicious activity score but does not appear anomalous with respect to the second and third malicious activity scores. Depending on the implementation, activity analyzer 306 may further evaluate execution of control plane operations with respect to the entity and/or the service provider in response to one or more scores indicating potential malicious activity scores and one or more scores not indicating potential malicious activity. For example, activity analyzer 306 in a further example embodiment evaluates how often the service provider operates at maximum activity with respect to the entity in a given period of time (e.g., a week, a month, a billing period, etc.) and determines whether the execution of the first control plane operation is anomalous based on this further analysis. Further still, and as discussed further with respect to FIG. 7, activity analyzer 306 in a further example embodiment evaluates executions of control plane operations by the service provider on behalf of entities other than the first entity (e.g., other customers of the service provider) and determines whether the execution of the first control plane operation is anomalous based on this further analysis.

In step 410, responsive to the determination that the first control plane operation potentially corresponds to malicious activity, a security alert is generated. For instance, security alert generator 308 receives indication 314 and generates security alert 236. Security alert 236 may include information associated with the identification(s) made by log analyzer 302, additional analysis made by log analyzer 302, analysis result 310, malicious activity score 312, determination(s) made by activity analyzer 306, indication 314, log(s) 234, and/or any other information associated with the control plane operation executed by the cloud application, as described elsewhere herein.

In embodiments, security alert generator 308 may generate security alert 236 based on one record of a control plane operation executed by a cloud application or a plurality of records of control plane operations executed by one or more cloud applications. For example, activity analyzer 306 may determine a plurality of control plane operations across multiple records (e.g., in the same log or in multiple logs) potentially correspond to malicious activity. In this example, activity score determiner 304 determines a plurality of malicious activity scores of the plurality of control plane operations and activity analyzer 306 evaluates the determined plurality of malicious activity scores. For example, activity analyzer 306 may aggregate executions of control plane operations by the same service provider (e.g., based on service provider IDs, service principal IDs associated with the service provider, IP addresses of computing devices associated with the service provider, application IDs associated with the service provider, and/or any other information included in analyzed logs, as described elsewhere herein) in order to determine that the control plane operations potentially correspond to malicious activity of the service provider. In this context, if activity analyzer 306 determines that the plurality of control plane operations potentially correspond to malicious activity, security alert generator 308 generates security alert 236. Security alert 236 may include information associated with each of the control plane operations, respective malicious activity scores, and/or any other information associated with the aggregated control plane operations. For example, security alert 236 may include a rank of each control plane operation in terms of how likely it corresponds to malicious activity (i.e., a degree to which the control plane operation is anomalous with respect to the entity).

Figure 5:
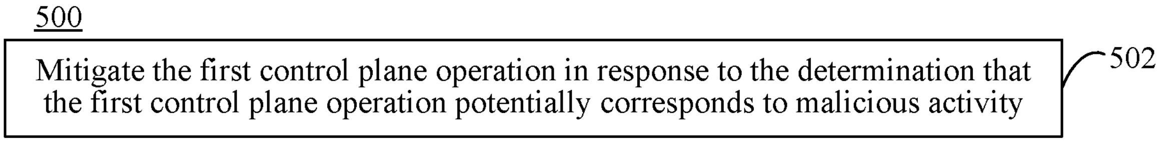
FIG. 5 shows a flowchart of a process for mitigating a control plane operation, in accordance with an embodiment.

As described elsewhere herein, embodiments of management services may mitigate control plane operations based on determinations that the control plane operation potentially corresponds to malicious activity. For instance, FIG. 5 shows a flowchart 500 of a process for mitigating a control plane operation, in accordance with an embodiment. Mitigator 118 of FIG. 1 may operate according to flowchart 500 in embodiments. Note that flowchart 500 need not be performed in all embodiments. Further structural and operational embodiments will be apparent to persons skilled in the relevant art(s) based on the following description of FIG. 5.

Flowchart 500 includes step 502. In step 502, the first control plane operation is mitigated based on the determination that the first control plane operation potentially corresponds to malicious activity. For example, mitigator 118 of FIG. 1 mitigates a first control plane operation based on a determination that the first control plane operation potentially corresponds to malicious activity (e.g., by activity analyzer 306 as described with respect to FIGS. 3 and 4). In accordance with an embodiment, mitigator 118 mitigates the control plane operation in response to indication 314. Alternatively, mitigator 118 may mitigate the control plane operation in response to security alert 236 or a request received from a computing device (e.g., user computing devices 104A-104N of FIG. 1 or user computing device 204 of FIG. 2) on behalf of a user (e.g., a customer user, an individual user, an administrative user, a service team user, etc.), a device of a service provider system (e.g., service provider systems 102A-102N of FIG. 1 or service provider system 202 of FIG. 2) on behalf of a service provider (e.g., a CSP), an admin computing device (e.g., admin computing device 106 of FIG. 1) on behalf of an admin user (e.g., a cloud provider service team user, a cloud provider developer user, a cloud provider account management user, etc.), or an application executing on a computing device (e.g., an anti-virus application). Depending on the technique used to mitigate the control plane operation, mitigator 118 mitigates the control plane operation or generates a mitigation signal that causes a mitigation step to be performed by one or more of resource manager 108, service provider activity monitor 116, another component of monitoring and mitigation service 110 (not shown in FIG. 1), a system of service provider systems 102A-102N, a computing device of user computing devices 104A-104N, admin computing device 106, server infrastructure 112 (or a component thereof), another component or subcomponent of system 100, and/or another computing device or application, as described elsewhere herein, or as would be understood by a person of skill in the relevant art(s) having benefit of this disclosure.

As discussed above, mitigator 118 may cause a mitigation step to be performed based on a generated security alert (e.g., security alert 236) or an indication that a control plane operation potentially corresponds to malicious activity (e.g., indication 314) by generating a mitigation signal. Examples of a mitigation signal include, but are not limited to, a notification (e.g., to an administrator) that indicates potential malicious activity has been detected, provides a description of the potential malicious activity (e.g., by specifying the service provider that operated on behalf of the entity, by specifying the control plane operations associated with the malicious activity, specifying the IP address(es) from which the control plane operations were initiated, times at which the control plane operations occurred, an identifier of the entity or service provider that initiated the control plane operations, an identifier of the resource(s) that were accessed or attempted to be accessed, one or more generated malicious activity scores, etc.), causes an access key utilized to access, deploy, or create the resource(s) to be changed, removes resource(s), deallocates resource(s), restricts access to resource(s), and/or the like. The notification may comprise a short messaging service (SMS) message, a telephone call, an e-mail, a notification that is presented via an incident management service, a security tool, etc. Other examples of mitigation signals include, but are not limited to, commands issued to resource manager 108, commands issued to service provider activity monitor 116, and/or commands issued to another component or subcomponent of system 100. Such commands include, but are not limited to, commands to change (e.g., rotate) keys used to access, deploy, and/or create resources, commands to set permissions for a user or application, commands to alter alert thresholds, and/or other commands suitable for mitigating a control plane operation. It is noted that notifications may be issued responsive to detecting potentially malicious control plane operations regardless of whether such operations are actually malicious. In this way, an administrator may decide for himself or herself as to whether the detected operations are malicious based on an analysis thereof.

Figure 6:
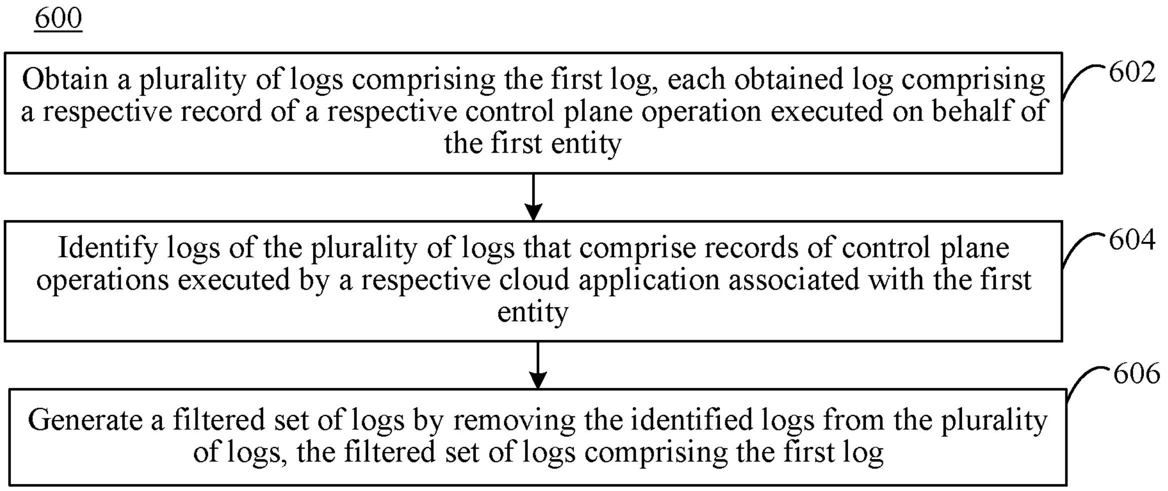
FIG. 6 shows a flowchart of a process for generating a filtered set of logs, in accordance with an embodiment.

As described with respect to FIG. 3, log analyzer 302 of FIG. 3 may obtain a plurality of logs (e.g., logs 234) in embodiments. In some embodiments, log analyzer 302 filters the obtained logs to generate a filtered set. For example, FIG. 6 shows a flowchart 600 of a process for generating a filtered set of logs, in accordance with an embodiment. Flowchart 600 is a further embodiment of step 402 of flowchart 400, as described with respect to FIG. 4. Log analyzer 302 may operate according to flowchart 600 in embodiments. Note that not all steps of flowchart 600 need be performed in all embodiments. Further structural and operational embodiments will be apparent to persons skilled in the relevant art(s) based on the following descriptions of FIGS. 3 and 6.

Flowchart 600 begins with step 602. In step 602, a plurality of logs comprising the first log are obtained. Each obtained log comprises a respective record of a respective control plane operation executed on behalf of the first entity. For example, log analyzer 302 obtains a plurality of logs (e.g., logs 234) comprising the first log. In this context, each obtained log of logs 234 comprises a respective record of a respective control plane operation executed on behalf of the first entity. As described with respect to FIGS. 3 and 4, log analyzer 302 may obtain logs 234 by accessing logs 212 stored in data storage 210 of FIG. 2 and/or receive logs streamed by resource manager 108 of FIG. 1.

In step 604, logs of the plurality of logs that comprise records of control plane operations executed by a respective cloud application associated with the first entity are identified. For instance, log analyzer 302 identifies logs of logs 234 that comprise records of control plane operations executed by a respective cloud application associated with the first entity. As a non-limiting example, and with reference to FIGS. 2 and 3, suppose logs 234 comprise a plurality of logs that comprise records of control plane operations executed by cloud applications associated with User A and CSP B operating on behalf of User A. In this example, in step 604 log analyzer 302 identifies logs of logs 234 that comprise records of control plane operations executed by cloud applications associated with User A (e.g., control plane operations requested by User A (e.g., via operation request 216), control plane operations requested by an application executing on a computing device associated with User A (e.g., user computing device 204), and/or the like).

In step 606, a filtered set of logs is generated by removing the identified logs from the plurality of logs. The filtered set of logs comprises the first log. For instance, log analyzer 302 removes logs identified in step 604 to generate a filtered set of logs, the filtered set of logs comprising the first log. With continued reference to the non-limiting example described with respect to step 604, log analyzer 302 removes logs that comprise records of control plane operations executed by cloud applications associated with User A to generate a filtered set of logs. In this example, the filtered set of logs comprises logs that comprise records of control plane operations executed by cloud applications associated with CSP B operating on behalf of User A (e.g., control plane operations requested by CSP B (e.g., via operation request 218 and/or operation request 220), control plane operations requested by an application executing on a device associated with CSP B (e.g., a device of service provider system 202), and/or the like). By removing identified logs in this manner, log analyzer 302 identifies control plane operations that a service provider executed on behalf of an entity.

In steps 604 and 606, log analyzer 302 is described as filtering logs by identifying and removing logs that comprise records of control plane operations executed by a respective cloud application associated with an entity. It is also contemplated herein that log analyzer 302 may be configured to filter logs by identifying logs that comprise records of control plane operations executed by a respective cloud application associated with a service provider (e.g., operating on behalf of the entity). For instance, as a non-limiting running example with reference to FIGS. 2 and 3, suppose logs 234 comprise a plurality of logs that comprise records of control plane operations executed by cloud applications associated with User A and CSP B operating on behalf of User A. In this example, log analyzer 302 identifies logs of logs 234 that comprise records of control plane operations executed by cloud applications associated with CSP B operating on behalf of User A and generates the filtered set of logs based on (and including) the identified logs.

Log analyzer 302 is described as filtering logs by identifying a cloud application that executed a control plane operation recorded in the log. However, it is also contemplated herein that log analyzer 302 (or another component of service provider activity monitor 116) may filter logs based on other criteria (either in addition to or in lieu of filtering based on the identified cloud application). For instance, in accordance with one or more embodiments, log analyzer 302 filters logs based on whether or not the control plane operation is more likely to be representative of malicious behavior. For example, log analyzer 302 (or another component of service provider activity monitor 116 (e.g., activity score determiner 304)) determines if the type of control plane operation is included in a list of impactful operations. Impactful operations are operations that have been determined to have a relatively high impact upon the security of a cloud-based system (e.g., a cloud computing platform). Examples of impactful operations may include operations that, when executed, modify a rule of a firewall, create a rule of a firewall, access authentication keys (e.g., host keys, user keys, service provider keys, or public and private key pairs), modify a compute cluster, create a compute cluster, modify a security rule (e.g., a security alert suppression rule), create a security rule, access a storage (e.g., a secret storage), and/or otherwise impact the cloud-based system, an application associated with the cloud-based system, and/or a user associated with the cloud-based system. The list of impactful operations may be stored in a data storage (e.g., data storage(s) 202 of FIG. 2), in embodiments. The list of impactful operations may be manually generated (e.g., by an admin user via admin computing device 106 of FIG. 1), automatically generated (e.g., based previous malicious activity detections, based on antivirus software detecting malicious activity, etc.), or generated by a combination of automatic and manual techniques. A list of impactful operations may be updated on a periodic or intermittent basis to account for system changes, observed malicious behavior, updated research, or the like. In some embodiments, a list of impactful operations includes ratings of how likely a particular type of impactful operation is indicative of potentially malicious activity. In some embodiments, a list of impactful operations includes sub-groupings of operations that, when executed in proximity to one another, are indicative of potentially malicious activity.

Figure 7:
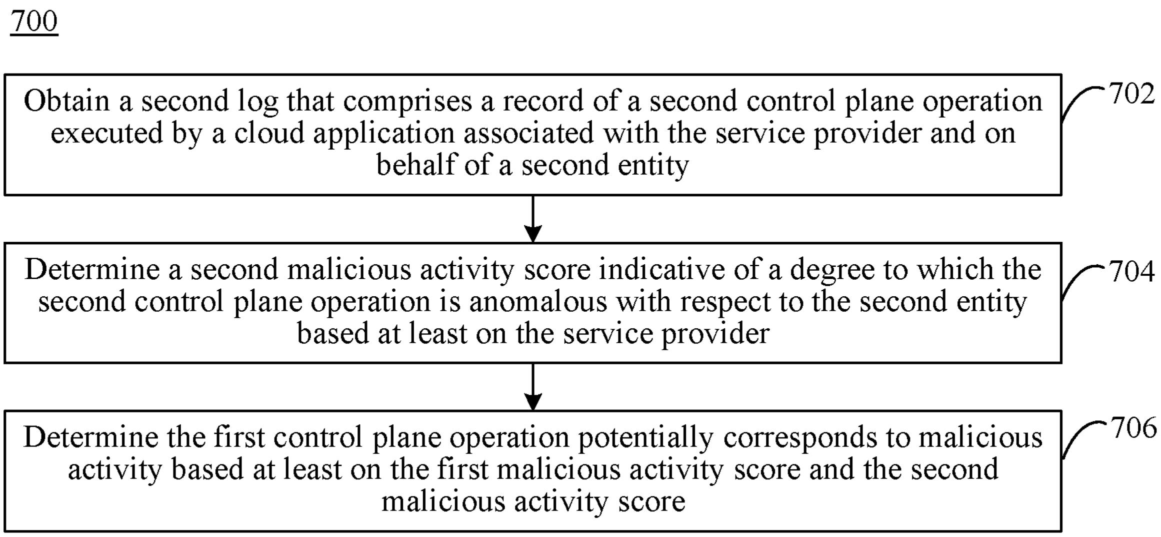
FIG. 7 shows a flowchart of a process for determining a control plane operation potentially corresponds to malicious activity, in accordance with an embodiment.

Activity analyzer 306 of FIG. 3 may determine a control plane operation potentially corresponds to malicious activity in a variety of ways, in embodiments. For instance, activity analyzer 306 may determine a control plane operation potentially corresponds to malicious activity based on an analysis of control plane operations executed by the same service provider on behalf of multiple entities. For example, FIG. 7 shows a flowchart 700 of a process for determining a control plane operation potentially corresponds to malicious activity, in accordance with an embodiment. Service provider activity monitor 116 of FIG. 3 may operate according to flowchart 700 in embodiments. Note that not all steps of flowchart 700 need be performed in all embodiments. Further structural and operational embodiments will be apparent to persons skilled in the relevant art(s) based on the following descriptions of FIGS. 3 and 7.

Flowchart 700 begins with step 702. In step 702, a second log that comprises a record of a second control plane operation is obtained. The second control plane operation is executed by a cloud application associated with the service provider and on behalf of a second identity. For example, log analyzer 302 of FIG. 3 obtains a second log in a similar manner as logs 234, as described with respect to step 402 of flowchart 400 of FIG. 4. In accordance with an embodiment, the second log is included in logs 234. For instance, log analyzer 302 may obtain multiple logs executed with respect to multiple (e.g., different) entities at a time. In accordance with an embodiment, log analyzer 302 identifies the service provider based on an analysis of the second log. Alternatively, log analyzer 302 obtains the second log based on the identification of the service provider in step 404 of flowchart 400.

In step 704, a second malicious activity score is determined based at least on the service provider. The second malicious activity score is indicative of a degree to which the second control plane operation is anomalous with respect to the second entity. For example, activity score determiner 304 of FIG. 3 determines a second malicious activity score based at least on the identified service provider. Activity score determiner 304 may determine the second malicious activity score in a similar manner to determining the first malicious activity score as described with respect to step 406 of flowchart 400 of FIG. 4, in a manner described with respect to FIGS. 8 and 9, in a manner described with respect to FIGS. 10 and 11, and/or as otherwise described elsewhere herein.

Flowchart 700 continues to step 706. In accordance with an embodiment, step 706 is a further embodiment of step 408 of flowchart 400, as described with respect to FIG. 4. In step 706, a determination that the first control plane operation potentially corresponds to malicious activity is made based at least on the first malicious activity score and the second malicious activity score. For example, activity analyzer 306 determines that the first control plane operation potentially corresponds to malicious activity based at least on malicious activity score 312 and the second malicious activity score determined in step 704.

Activity analyzer 306 may determine that the first control plane operation potentially corresponds to malicious activity based on multiple malicious activity scores in various ways. For instance, activity analyzer 306 may identify patterns in execution of control plane operations by the same service provider operation on behalf of multiple entities based on malicious activity score 312 and the second malicious activity score determined in step 704. As a non-limiting example, suppose malicious activity score 312 is greater than a first alert threshold that indicates further analysis is to be performed prior to determining that the first control plane operation potentially corresponds to malicious activity. In this example, activity analyzer 306 determines that other control plane operations executed by the service provider on behalf of other entities are to be analyzed. Additional logs are obtained, and the second malicious activity score is determined, as respectively described with respect to steps 702 and 704. In step 706, activity analyzer 306 analyzes the first and second malicious activity scores and determines a potential pattern of malicious activity. Activity analyzer 306 further analyzes the executions of the first and second control plane operations to identify the pattern. For instance, suppose both the first and second control plane operation are the same type of control plane operation and the execution of that type of control plane operation is anomalous with respect to the first and second entities. In this context, activity analyzer 306 determines that the first and second control plane operations potentially correspond to malicious activity based on the identified pattern.

Figure 8:
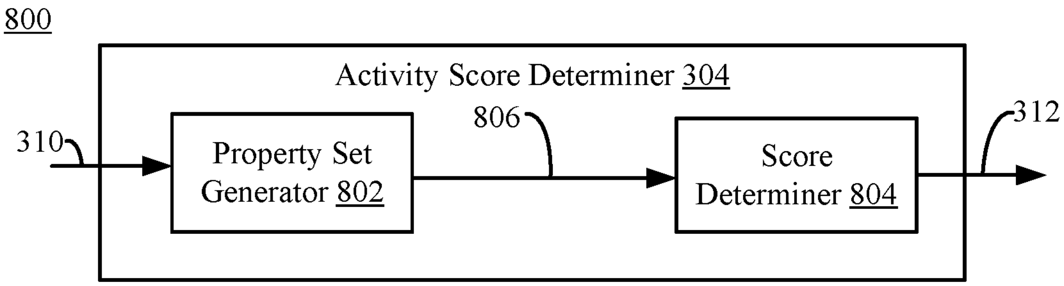
FIG. 8 shows a block diagram of the activity score determiner of FIG. 3, in accordance with an embodiment.

Activity score determiner 304 may determine malicious activity scores in various ways, in embodiments. For example, FIG. 8 shows a block diagram 800 of activity score determiner 304 of FIG. 3, in accordance with an embodiment. As shown in FIG. 8, activity score determiner 304 includes a property set generator 802 and a score determiner 804. Depending on the implementation, each of property set generator 802 and score determiner 804 may be implemented as services executing on the same computing device.

Alternatively, property set generator 802 and score determiner 804 are executed on separate computing devices configured to communicate with each other over a network (e.g., network 114, an internal network of server infrastructure 112, and/or the like).

Figure 9:
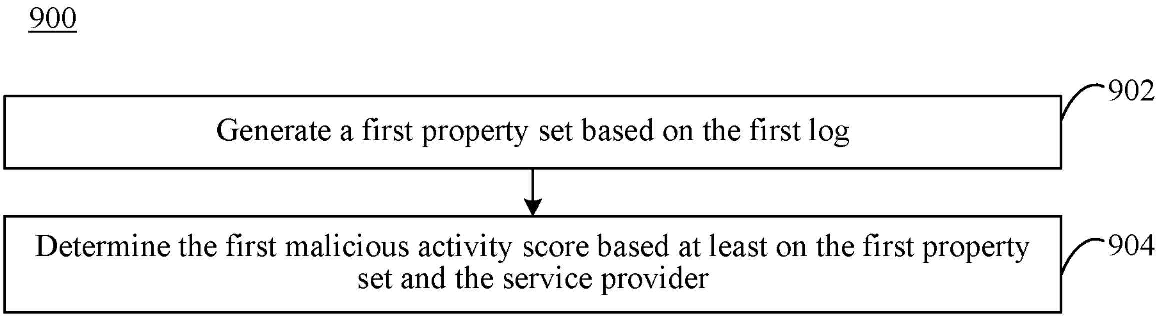
FIG. 9 shows a flowchart of a process for determining malicious activity scores, in accordance with an embodiment.

For illustrative purposes, activity score determiner 304 of FIG. 8 is described with respect to FIG. 9. FIG. 9 shows a flowchart 900 of a process for determining malicious activity scores, in accordance with an embodiment. Flowchart 900 is a further embodiment of step 406 of flowchart 400, as described with respect to FIG. 4. Activity score determiner 304 may operate according to flowchart 900 in embodiments. Note that not all steps of flowchart 900 need be performed in all embodiments. Further structural and operational embodiments will be apparent to persons skilled in the relevant art(s) based on the following descriptions of FIGS. 8 and 9.

Flowchart 900 begins with step 902. In step 902, a first property set is generated based on the first log. For example, property set generator 802 of FIG. 8 generates a first property set 806 based on analysis result 310. First property set 806 includes any properties associated with the first control plane operation corresponding to analysis result 310, such as but not limited to, a day of the week the control plane operation was executed, a time of day the control plane operation was executed, a name or operation ID of the control plane operation, an entity ID of the entity the control plane operation was executed with respect to, a service provider ID of the service provider that is operating on behalf of the entity, a service ID (e.g., a service principal ID) associated with the cloud application that executed the control plane operation, a resource ID (e.g., of a resource and/or group of resources) to which the control plane operation was applied, the region the computing device that issued the control plane operation is located in, an IP address of the computing device that issued the control plane operation and/or any other property associated with the control plane operation executed by the cloud application, the cloud application, and/or associated entities and/or service providers suitable for detecting potential malicious activity.

In step 904, a first malicious activity score is determined based at least on the first property set and the service provider. For example, score determiner 804 determines malicious activity score 312 based at least on first property set 806 and the service provider identified by log analyzer 302 (e.g., in a manner described with respect to step 402 of FIG. 4). In some embodiments, score determiner 804 determines malicious activity score 312 based on multiple properties of first property set 806. For instance, score determiner 804 may determine malicious activity score 312 by determining whether each property of first property set 806 is indicative of potential malicious activity, assigning a rating to each respective property, and determining malicious activity score 312 as a combination of the assigned ratings (e.g., as a sum of the ratings). In accordance with a further embodiment, the ratings are binary (e.g., a property is either indicative of potential malicious activity or is not indicative). Alternatively, the ratings indicate a degree to which the property is indicative of potential malicious activity (e.g., as a percentage of likelihood that the property is indicative of potential malicious activity, on a scale of 1 to 10, on a scale of 1 to 100, and/or other types of ratings that may be used to indicate a degree to which the property is indicative of potential malicious activity). Furthermore, score determiner 804 in accordance with an embodiment assigns a weight to each property that adjusts the impact the property has in determining malicious activity score 312. In this context, weights may be default weights of score determiner 804, weights assigned by an admin of the cloud provider (e.g., via an application executing on admin computing device 106 of FIG. 1), weights assigned by a service provider (e.g., via an application executing on a respective service provider system (e.g., any of service provider systems 102A-102N of FIG. 1 or service provider system 202 of FIG. 2), weights assigned by an entity (e.g., via an application executing on an entity computing device (e.g., a computing device of any of user computing devices 104A-104N of FIG. 1, and/or user computing device 204 of FIG. 2), and/or weights assigned by a ML model suitable for determining malicious activity scores (e.g., the ML model described with respect to step 406 of FIG. 4).

In some embodiments, score determiner 804 considers certain properties of first property set 806 depending on another property of first property set 806 and the identified service provider. As a non-limiting example, suppose first property set 806 includes an operation type property that indicates the first control plane operation is creating a single virtual machine. In this context, score determiner 804 may evaluate properties of first property set 806 with respect to the service provider, such as but not limited to, the size of the virtual machine, how many queries the virtual machine may process, the amount of memory the virtual machine has, the storage space (e.g., disk space) of the virtual machine, the operating system of the virtual machine, an image used for the virtual machine, whether the virtual machine has a dedicated graphics card, and/or the like.

In accordance with an embodiment, score determiner 804 evaluates properties of first property set 806 with respect to properties of operations (e.g., of the same type, of a similar type, etc.) executed by the identified service provider on behalf of other entities to determine malicious activity score 312. For instance, suppose property set generator 802 obtains logs that comprise records of control plane operations executed by cloud applications associated with the service provider and on behalf of entities other than the first entity (e.g., in a manner similar to that as described with respect to step 702 of FIG. 7). In this context, property set generator 802 generates respective second property sets based on the respective logs. Score determiner 804 evaluates the properties of first property set 806 with respect to corresponding properties of the second property sets. As a non-limiting example and with respect to the running example described with respect to FIGS. 3 and 4, suppose first property set 806 comprises a first property indicating a type of Operation C and a second property indicating a frequency at which that type of operations are executed with respect to User A by CSP B. Furthermore, suppose each second property set comprises a respective third property indicating a type of the respective control plane operation and a respective fourth property indicating a frequency at which that type of operations are executed with respect to the respective entities by CSP B. In this example, score determiner 804 identifies control plane operations associated with the second property sets that are the same type of control plane operation as the first control plane operation associated with first property set 806 (e.g., by matching respective third properties to the first property). Score determiner 804 determines a degree to which the frequency of the execution of the type of the first control plane operation with respect to the first entity is similar to the respective frequencies of the execution of the type of respective second control plane operations with respect to second entities (e.g., by determining a degree of similarity between the second property and an average of the respective fourth properties). In this context, the lower the determined degree of similarity, the higher the value of malicious activity score 312 determined by score determiner 804, and vice versa. By evaluating a control plane operation executed by a service provider on behalf of a first entity with respect to control plane operations executed by the same service provider on behalf of multiple entities, service provider activity monitors are able to identify a typical pattern in the execution of control plane operations with respect to entities.

In the above example, a malicious activity score is inversely proportional to the degree of similarity between properties of first property set 806 and second property sets. Alternatively, it is also contemplated herein that a malicious activity score may be directly proportional to the degree of similarity. For instance, suppose the first property set includes a fifth property that indicates a service principal ID, IP address, user ID, and/or another identifier that uniquely identifies the service principal, computing device, user account, and/or application that issued the first control plane operation. In this context, score determiner 804 identifies control plane operations associated with the second property sets that are issued by the same service principal, computing device, user account, and/or application (e.g., by matching corresponding properties of the second property sets to the fifth property). Score determiner 804 determines a degree of similarity between the second property of first property set 806 and respective fourth properties of the respective second property sets associated with the identified control plane operations. In this context, the higher the determined degree of similarity, the higher the value of malicious activity score 312 determined by score determiner 804, and vice versa. By evaluating a control plane operation executed by a particular service principal, computing device, user account, and/or application associated with the service provider on behalf of a first entity with respect to control plane operations executed by the same service principal, computing device, user account, and/or application, service provider activity monitors are able to identify patterns of anomalous activity across multiple entities (e.g., by identifying a (e.g., potentially) compromised or malicious service principal, computing device, user account, and/or application).

In accordance with an embodiment, score determiner 804 evaluates properties of first property set 806 with respect to properties of control plane operations previously executed by the service provider on behalf of the entity. Additional details regarding evaluating previously executed control plane operations are described with respect to FIGS. 10 and 11, as well as elsewhere herein.

Figure 10:
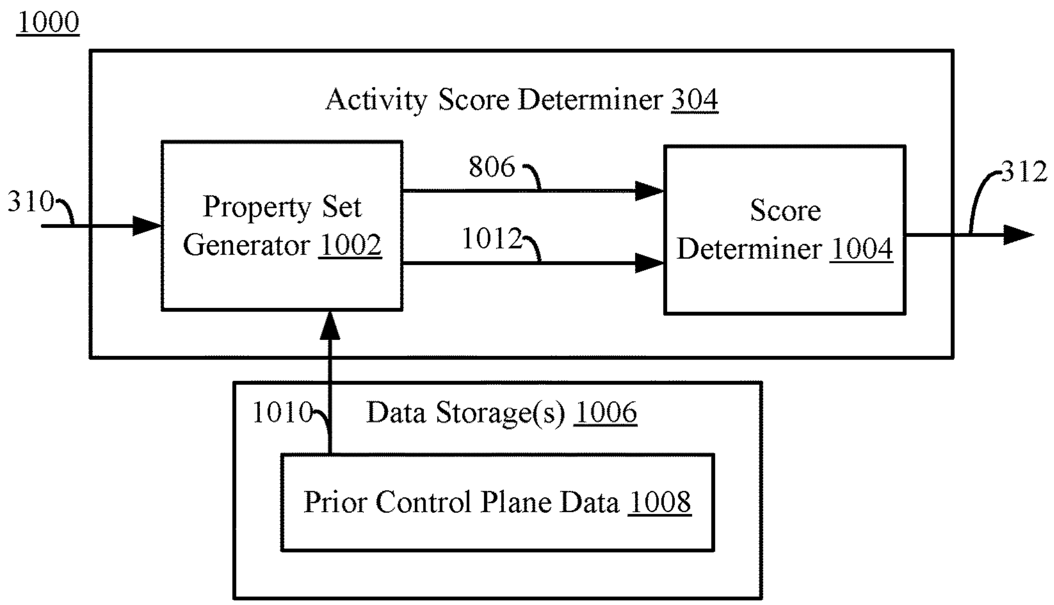
FIG. 10 shows a system for determining malicious activity scores, in accordance with an embodiment.

As described herein, activity score determiner 304 may determine malicious activity scores in various ways, in embodiments. For example, FIG. 10 shows a block diagram of a system 1000 for determining a malicious activity score, in accordance with an embodiment. As shown in FIG. 10, system 1000 includes activity score determiner 304 of FIG. 3 and data storage(s) 1006 ("data storage 1006"). Activity score determiner 304 includes a property set generator 1002 and a score determiner 1004, which are further embodiments of property set generator 802 and score determiner 804, as described with respect to FIG. 8. Data storage 1006 stores prior control plane data 1008 and/or any other information described herein. As shown in FIG. 10, data storage 1006 is external to activity score determiner 304; however, it is also contemplated that all or a portion of data storage 210 may be internal to a computing device executing activity score determiner 304. Furthermore, data storage 1006 may be included in a storage node of clusters 120A and/or 120N of FIG. 1, or in a storage device external to server infrastructure 112 of FIG. 1. In accordance with an embodiment, data storage 1006 is included in data storage 210 of FIG. 2.

As described above, data storage 1006 stores prior control plane data 1008. In accordance with an embodiment, prior control plane data 1008 is a subset of logs 212 and comprises logs generated prior to the portal session a control plane operation was executed in. For instance, in reference to the running example described with respect to FIGS. 3 and 4, prior control plane data 1008 comprises logs of logs 212 generated (e.g., by resource manager 108) prior to the portal session corresponding to log 232. Alternatively, prior control plane data 1008 is data indicative of previously executed control operations associated with an entity and/or a service provider (e.g., trend data). In this context, prior control plane data 1008 may include operation properties extracted from previous control plane operations executed with respect to an entity and/or on behalf of an entity by a service provider, average activity of an entity and/or a service provider, maximum activity of an entity and/or a service provider, and/or any other information regarding an entity, a service provider, and/or control plane operations executed with respect thereto, as described elsewhere herein.

Figure 11:
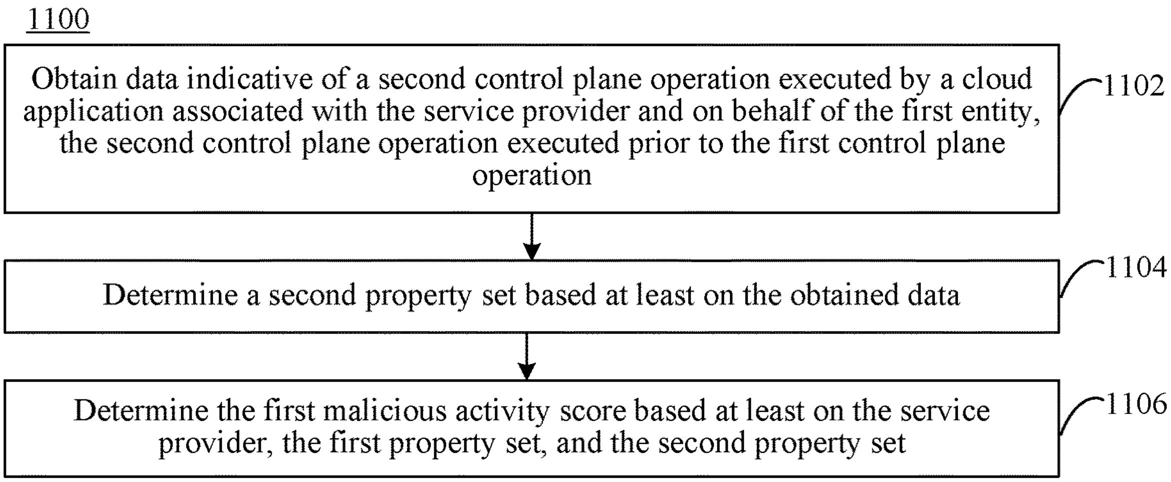
FIG. 11 shows a flowchart of a process for determining malicious activity scores, in accordance with an embodiment.

For illustrative purposes, system 1000 of FIG. 10 is described with respect to FIG. 11. FIG. 11 shows a flowchart 1100 of a process for determining malicious activity scores, in accordance with an embodiment. Flowchart 1100 is a further embodiment of step 406 of flowchart 400, as described with respect to FIG. 4. System 1000 may operate according to flowchart 1100 in embodiments. Note that not all steps of flowchart 1100 need be performed in all embodiments. Further structural and operational embodiments will be apparent to persons skilled in the relevant art(s) based on the following descriptions of FIGS. 10 and 11.

Flowchart 1100 begins with step 1102. In step 1102, data indicative of a second control plane operation executed by a cloud application associated with the service provider and on behalf of the first entity is obtained. The second control plane operation is a control plane operation executed prior to the first control plane operation. For instance, property set generator 1002 of FIG. 10 obtains data 1010 from prior control plane data 1008. In accordance with an embodiment, property set generator 1002 obtains data 1010 based at least on the service provider identified by log analyzer 302 of FIG. 3 (e.g., in a manner described with respect to step 404 of flowchart 400 of FIG. 4). For example, property set generator 1002 may access data storage 1006 and obtain data 1010 based on a service provider ID identified by log analyzer 302 and an entity ID of the first entity. In this context, data 1010 is indicative of one or more control plane operations executed by a cloud application associated with the service provider prior to the first control plane operation (e.g., associated with analysis result 310) and on behalf of the first entity. For instance, data 1010 in accordance with an embodiment includes operation properties extracted from previous control plane operations executed by the cloud application associated with the service provider and on behalf of the first entity, average activity of the service provider, average activity of the first entity, maximum activity of the service provider, maximum activity of the first entity, and/or any other information regarding the first entity, the service provider, and/or control plane operations executed by the cloud application associated with the service provider and on behalf of the first entity.

In accordance with an alternate embodiment not shown in FIG. 10 for brevity, property set generator 1002 of FIG. 10 obtains data 1010 as an analysis result of log analyzer 302 of FIG. 3 analyzing logs. For instance, suppose prior control plane data 1008 comprises (e.g., historic) logs. In this context, log analyzer 302 accesses prior control plane data 1008 and obtains historic logs based on a service provider ID of the identified service provider and an entity ID of the first entity. Log analyzer 302 analyzes the obtained historic logs to generate data 1010 as an analysis result.

In step 1104, a second property set is generated based at least on the obtained data. For example, property set generator 1002 of FIG. 10 generates first property set 806 based at least on analysis result 310 (e.g., in a manner similar to that described with respect to FIGS. 8 and 9) and a second property set 1012 based at least on data 1010. First property set 806 and second property set 1012 include any properties associated with control plane operations recorded in the respective logs, such as but not limited to, a day of the week the control plane operation was executed, a time of day the control plane operation was executed, a name or operation ID of the control plane operation, an entity ID of the entity the control plane operation was executed with respect to, a service provider ID of the service provider that is operating on behalf of the entity, a service ID (e.g., a service principal ID) associated with the cloud application that executed the control plane operation, a resource ID (e.g., of a resource and/or group of resources) to which the control plane operation was applied, the region the computing device that issued the control plane operation is located in, an IP address of the computing device that issued the control plane operation and/or any other property associated with the control plane operation executed by the cloud application, the cloud application, and/or associated entities and/or service providers suitable for detecting potential malicious activity.

In some embodiments, property set generator 1002 generates second property set 1012 based on a plurality of previously executed control plane operations (e.g., from trend data stored as prior control plane data 1008 and/or from a plurality of logs). Depending on the implementation, property set generator 1002 may determine an average of a property across executions of control plane operations, a maximum of a property across the executions, a minimum of a property across the executions, a mode of a property across the executions, and/or the like in order to generate second property set 1012. For instance, property set generator 1002 in a non-limiting example determines the average number of compute resources created by a service provider operating on behalf of an entity (e.g., a tenant) in a given time period (e.g., per day, per week, per month, etc.) based on a number of compute resources created property extracted from data 1010. Furthermore, property set generator 1002 in this non-limiting example determines the maximum number of compute resources created by the service provider on behalf of the entity in a single instance (e.g., an execution of a single control plane operation, execution of subsequent control plane operations, etc.) or within a shortened period of time (e.g., a number of minutes, a number of hours, a day).

Flowchart 1100 continues to step 1106. In accordance with an embodiment, step 1106 is a further embodiment of step 904 of flowchart 900, as described with respect to FIG. 9. In step 1106, the first malicious activity score is determined based at least on the service provider, the first property set, and the second property set. For example, score determiner 1004 determines malicious activity score 312 based at least on the identified service provider, first property set 806, and second property set 1012. Score determiner 1004 may determine malicious activity score 312 based at least on the identified service provider, first property set 806, and second property set 1012 in various ways. For instance, score determiner 1004 may determine a respective degree to which each property of first property set 806 is similar to corresponding properties of second property set 1012, assigns a rating to each property indicative of the respective determined degree, and determines malicious activity score 312 as a combination of the assigned ratings (e.g., as a sum of the ratings). By determining malicious activity scores in this way, service provider activity monitors are able to determine if a control plane operation is anomalous based on whether properties of the first control plane operation are similar to properties of control plane operations previously executed on behalf of the entity. Score determiner 1004 may determine degrees of similarity and/or malicious activity scores based on the degrees of similarity in various ways (e.g., in similar manners to those described with respect to step 904 of FIG. 1, as well as elsewhere herein).

As a non-limiting example, and with reference to the running example described with respect to FIGS. 3 and 4, suppose first property set 806 comprises a first property indicating the type of Operation C is a resource creation operation and a second property indicating the number of resources created. Furthermore, suppose second property set 1006 comprises subsets of properties corresponding to previous executions of control plane operations, and each subset comprises a respective third property indicating the type of control plane operation executed by CSP B on behalf of User A. Furthermore, each subset comprises a respective fourth property indicating the number of resources created. In this example, score determiner 1004 identifies subsets wherein the third property indicates the type of control plane executed is a resource creation operation and determines a degree to which the number of resources created by Operation C is similar to the respective number of resources created by the previous executions of control plane operations (e.g., by determining a degree of similarity between the second property and an average of the respective fourth properties). In this context, the lower the determined degree of similarity, the higher the value of malicious activity score 312 determined by score determiner 1004, and vice versa.

In some embodiments, obtained data 1010 comprises properties previously extracted from past control plane logs. In this context, obtained data 1010 may include running averages or trends of various properties across multiple executions of control plane operations with respect to an entity. As a non-limiting example, suppose obtained data 1010 includes an average number of resources created per control plane operation previously executed by CSP B on behalf of User A. Furthermore, suppose property set generator 1002 generated property set 806 to include a first property indicating the type of Operation C is a resource creation operation and a second property indicating the number of resources created by Operation C, and generated second property set 1012 to include a third property that indicates the average resources created per previously executed control plane operation. In this context, score determiner 1004 determines to evaluate the second property with respect to the third property based on the type of Operation C indicated by the first property. By maintaining running averages or trends in control plane operations in prior control plane data 1008, service provider activity monitors are able to detect anomalous activity while using a smaller amount storage space (e.g., compared to storing (e.g., all) historic logs).

In some embodiments, score determiner 1004 considers certain operation properties of first property set 806 and second property set 1012 depending on another operation property of first property set 806. As a non-limiting example, suppose first property set 806 includes an operation type property that indicates the first control plane operation is creating a single virtual machine. In this context, score determiner 1004 may evaluate properties of first property set 806 with respect to properties of second property set 1012, such as but not limited to, the size of the virtual machine, how many queries the virtual machine may process, the amount of memory the virtual machine has, the storage space (e.g., disk space) of the virtual machine, the operating system of the virtual machine, an image used for the virtual machine, whether the virtual machine has a dedicated graphics card, and/or the like. In this context, score determiner 1004 identifies additional properties to evaluate between property sets 806 and 1012 based on a property included in first property set 806.

Figure 12:
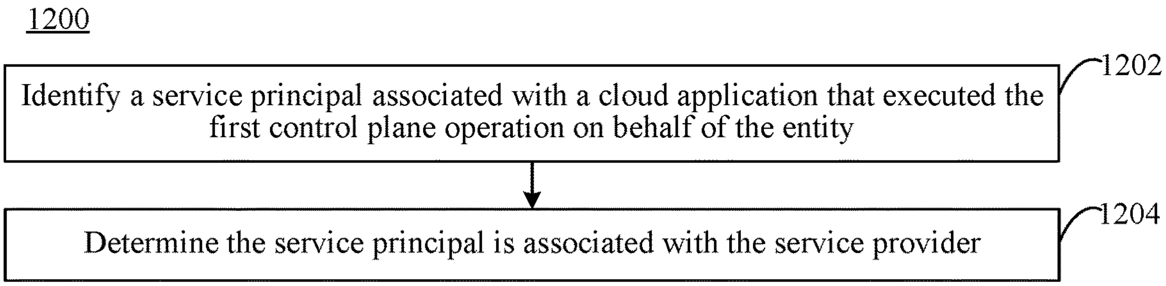
FIG. 12 shows a flowchart of a process for identifying a service provider, in accordance with an embodiment.

Log analyzer 302 of FIG. 3 may identify a service provider that is associated with the execution of a control plane operation in various ways, in embodiments. For instance, log analyzer 302, in some embodiments, identifies a service provider based on the cloud application that executed the control plane operation. For example, FIG. 12 shows a flowchart 1200 of a process for identifying a service provider, in accordance with an embodiment. Log analyzer 302 of FIG. 3 may operate according to flowchart 1200, in embodiments. Not all steps of flowchart 1200 need be performed in all embodiments. Further structural and operational embodiments will be apparent to persons skilled in the relevant art(s) based on the following descriptions of FIGS. 3 and 12.

Flowchart 1200 begins with step 1202. In step 1202, a service principal is identified. The service principal is associated with a cloud application that executed the first control plane operation on behalf of the entity. For example, log analyzer 302 of FIG. 3 analyzes a first log of logs 234 and identifies a service principal that is associated with a cloud application that executed the first control plane operation on behalf of the entity. As a non-limiting running example and with reference to FIGS. 2 and 3, suppose logs 234 comprise log 232 and log 232 corresponds to a portal session where a service principal associated with CSP B executed control plane operations on behalf of User A. In this context, log analyzer 302 analyzes log 232 and identifies an identifier of the service principal (e.g., a service principal ID) recorded in log 232.

In step 1204, a determination that the service principal is associated with the service provider is made. For example, log analyzer 302 of FIG. 3 determines that the service principal identified in step 1202 is associated with a service provider. Log analyzer 302 of FIG. 3 may determine that the service principal is associated with the service provider in various ways. For instance, a cloud provider associated with a network-based system may maintain data that maps service principals authorized to execute control plane operations to corresponding service providers associated with the service principals. In this context, log analyzer 302 accesses the mapping data to determine that the service principal identified in step 1202 is associated with a particular service provider. For instance, continuing the running example, suppose the cloud provider associated with system 200 of FIG. 2 maintains data that associates (e.g., maps) service principals to service providers in data storage 210 (not shown in FIG. 2 for brevity). In this example, log analyzer 302 accesses the data to identify the service provider based on the service principal ID of the identified service principal.

Figure 13:
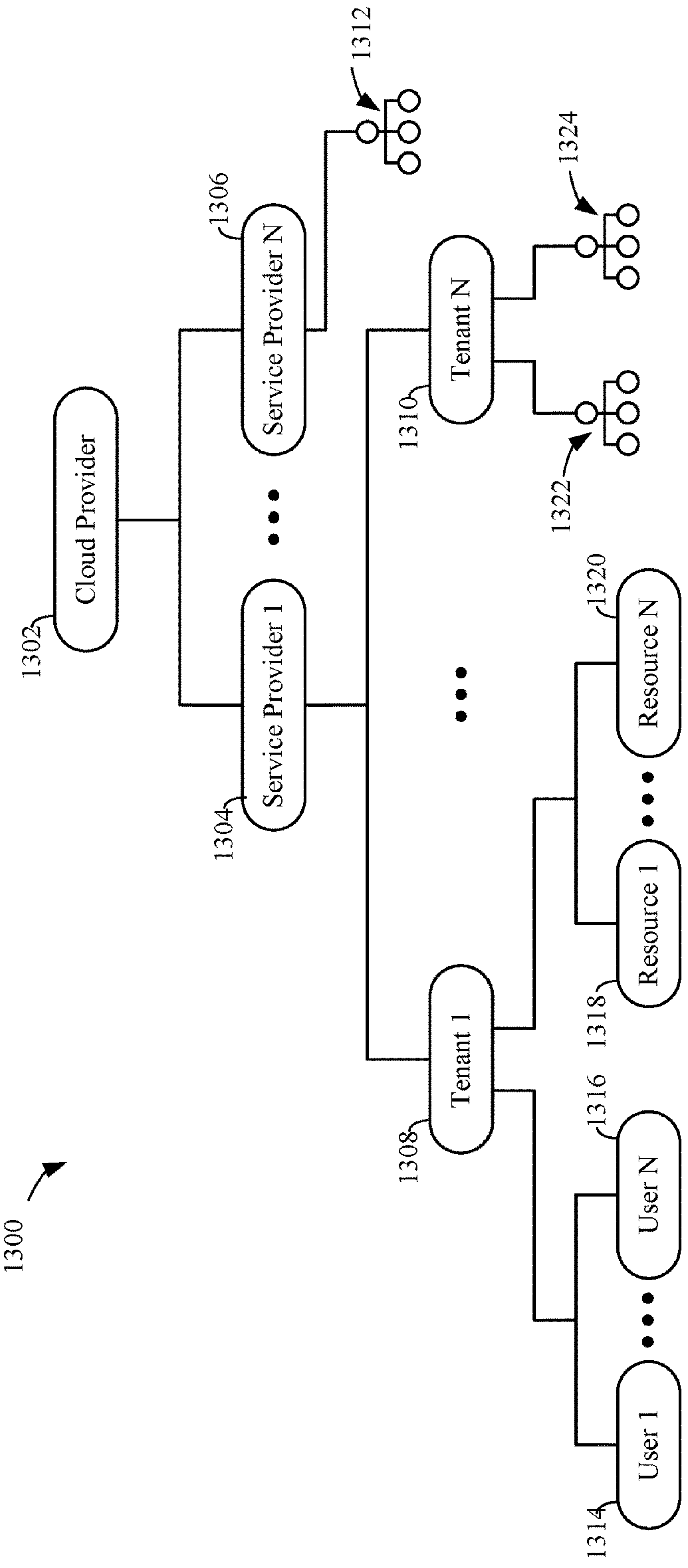
FIG. 13 shows a diagram of a hierarchy associated with cloud networks, in accordance with an embodiment.

As described herein, service providers (e.g., CSPs) support and manage subscriptions to cloud services on behalf of users and/or tenants of a cloud-based platform of a cloud provider. In accordance with an embodiment, the associations between cloud providers, service providers, and users corresponds to a hierarchy associated with cloud services of a cloud network. For example, FIG. 13 shows a diagram of a hierarchy 1300 ("diagram 1300" herein) associated with a cloud network, in accordance with an embodiment. Further structural and operational examples will be apparent to persons skilled in the relevant art(s) based on the following descriptions. Diagram 1300 is described as follows with respect to system 100 of FIG. 1.

Diagram 1300 as illustrated details a hierarchy of resources and users in a network-based (e.g., cloud-based) computing system. For example, a cloud provider 1302 manages the network-based computing system. Cloud provider 1302 may partner with one or more service providers, where service providers support and manage subscriptions of tenants to certain resources of the network-based computing system. For example, as shown in FIG. 13, the network-based computing system managed by cloud provider 1302 includes a service provider 1304 and service provider 1306. Each service provider may manage and support subscriptions of one or more tenants (e.g., tenants 1308 and 1310) to one or more resources (e.g., resources 1318 and 1320). Furthermore, each tenant may be associated with one or more users (e.g., user 1314 and user 1316) (e.g., employees, tenant users, individual users, group users, etc.).

In FIG. 13, service provider 1306 is shown with simplified sub-hierarchy 1312, and tenant 1310 is shown with user sub-hierarchy 1322 and resource sub-hierarchy 1324 for brevity; however, it should be understood that these sub-hierarchies may be similar to those shown for service provider 1304 and tenant 1308, respectively. Hierarchies of segments may contain additional or fewer tiers than those shown in diagram 1300 as described herein or as otherwise be understood by persons of skill in the relevant art(s) having the benefit of this disclosure, in embodiments. For example, users (e.g., user 1314 and user 1316) may represent user groups that include respective individual users (e.g., individual users within a group) and resources (e.g., resources 1318 and 1320) may represent resource groups that include respective resource units (e.g., individual resources within a group). Further, different branches of tiers may include sub-hierarchies that differ from other branches. For example, as shown in FIG. 13, tenant 1308 is associated with respective users and resources; however, tenant 1310, for example, may be associated with subscriptions, resources, users, and/or applications. As another example, as shown in FIG. 13, service provider 1304 is associated with respective tenants, users, and resources; however, service provider 1306, for example, may be associated with users that are not associated with a tenant (e.g., a tenant user or individual user).

Thus, an example hierarchy of a network-based computing system has been described with respect to diagram 1300 of FIG. 13. In some embodiments, hierarchies such as diagram 1300 are used to determine which service providers support and manage subscriptions on behalf of which tenants and/or users. For instance, in accordance with an embodiment, log analyzer 302 of FIG. 3 references a representation of hierarchy 1300 when identifying a service provider. In accordance with another embodiment, log analyzer 302 references a representation of hierarchy 1300 to identify additional logs to analyze with respect to a first log. For example, suppose log analyzer 302 analyzes a log that comprises a record of a control plane operation executed on behalf of user 1314 by identified service provider 1304. In this example, log analyzer 302 references a representation of hierarchy 1300 to determine that service provider 1304 supports and manages other users of tenant 1308 (e.g., user 1316) and users of tenant 1310. Based on this determination, log analyzer 302 (or another component of service provider activity monitor 116) may evaluate control plane operations executed on behalf of users of tenants 1308 and 1310 to determine if the execution of the control plane operation potentially corresponds to malicious activity.

IV. Example Computing Device Embodiments

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 14:
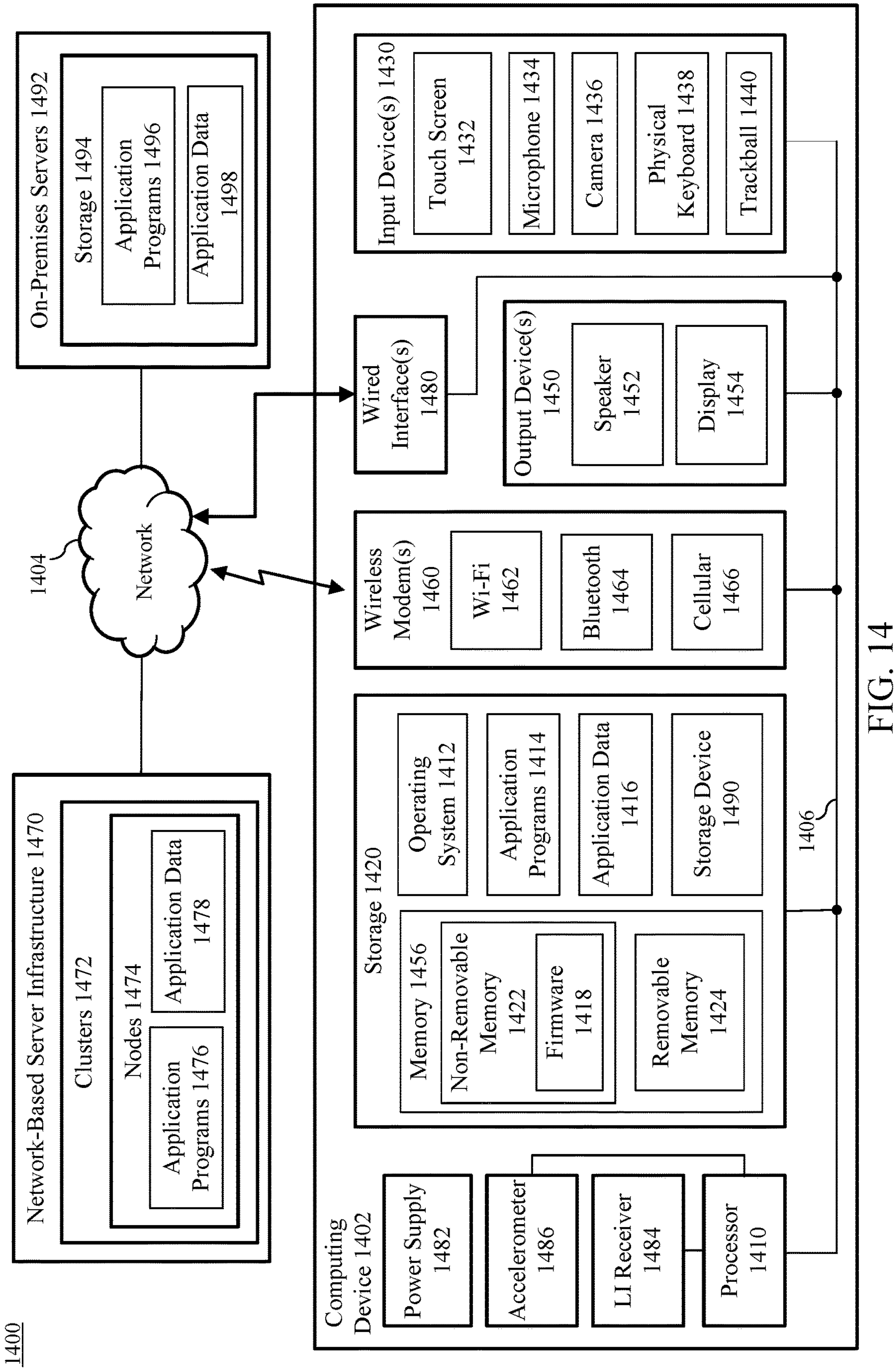
FIG. 14 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 14. FIG. 14 shows a block diagram of an exemplary computing environment 1400 that includes a computing device 1402.

Computing device 1402 is an example of service provider system 102A, service provider system 102N, user computing device 104A, user computing device 104N, admin computing device 106, node 122A, node 122N, node 124A, and/or node 124N of FIG. 1, and/or user computing device 204 and/or service provider system 202 of FIG. 2, each of which may include one or more of the components of computing device 1402. In some embodiments, computing device 1402 is communicatively coupled with devices (not shown in FIG. 14) external to computing environment 1400 via network 1004. Network 1404 is an example of network 114 of FIG. 1. Network 1404 comprises one or more networks such as local area networks (LANs), wide area networks (WANs), enterprise networks, the Internet, etc., and may include one or more wired and/or wireless portions. Network 1404 may additionally or alternatively include a cellular network for cellular communications. Computing device 1402 is described in detail as follows.

Computing device 1402 can be any of a variety of types of computing devices. For example, computing device 1402 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 1402 may alternatively be a stationary computing device such as a desktop computer, a personal computer (PC), a stationary server device, a minicomputer, a mainframe, a supercomputer, etc.

As shown in FIG. 14, computing device 1402 includes a variety of hardware and software components, including a processor 1410, a storage 1420, one or more input devices 1430, one or more output devices 1450, one or more wireless modems 1460, one or more wired interfaces 1480, a power supply 1482, a location information (LI) receiver 1484, and an accelerometer 1486. Storage 1420 includes memory 1456, which includes non-removable memory 1422 and removable memory 1424, and a storage device 1490. Storage 1420 also stores an operating system 1412, application programs 1414, and application data 1416. Wireless modem(s) 1460 include a Wi-Fi modem 1462, a Bluetooth modem 1464, and a cellular modem 1466. Output device(s)

1450 includes a speaker 1452 and a display 1454. Input device(s) 1430 includes a touch screen 1432, a microphone 1434, a camera 1436, a physical keyboard 1438, and a trackball 1440. Not all components of computing device 1402 shown in FIG. 14 are present in all embodiments, additional components not shown may be present, and any combination of the components may be present in a particular embodiment. These components of computing device 1402 are described as follows.

A single processor 1410 (e.g., central processing unit (CPU), microcontroller, a microprocessor, signal processor, ASIC (application specific integrated circuit), and/or other physical hardware processor circuit) or multiple processors 1410 may be present in computing device 1402 for performing such tasks as program execution, signal coding, data processing, input/output processing, power control, and/or other functions. Processor 1410 may be a single-core or multi-core processor, and each processor core may be single-threaded or multithreaded (to provide multiple threads of execution concurrently). Processor 1410 is configured to execute program code stored in a computer readable medium, such as program code of operating system 1412 and application programs 1414 stored in storage 1420. Operating system 1412 controls the allocation and usage of the components of computing device 1402 and provides support for one or more application programs 1414 (also referred to as "applications" or "apps"). Application programs 1414 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 1402 can communicate with any other component according to function, although not all connections are shown for case of illustration. For instance, as shown in FIG. 14, bus 1406 is a multiple signal line communication medium (e.g., conductive traces in silicon, metal traces along a motherboard, wires, etc.) that may be present to communicatively couple processor 1410 to various other components of computing device 1402, although in other embodiments, an alternative bus, further buses, and/or one or more individual signal lines may be present to communicatively couple components. Bus 1406 represents one or more of any of several types of bus structures, including a memory bus or memory controller, a peripheral bus, an accelerated graphics port, and a processor or local bus using any of a variety of bus architectures.

Storage 1420 is physical storage that includes one or both of memory 1456 and storage device 1490, which store operating system 1412, application programs 1414, and application data 1416 according to any distribution. Non-removable memory 1422 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 1422 may include main memory and may be separate from or fabricated in a same integrated circuit as processor 1410. As shown in FIG. 14, non-removable memory 1422 stores firmware 1418, which may be present to provide low-level control of hardware. Examples of firmware 1418 include BIOS (Basic Input/Output System, such as on personal computers) and boot firmware (e.g., on smart phones). Removable memory 1424 may be inserted into a receptacle of or otherwise coupled to computing device 1402 and can be removed by a user from computing device 1402. Removable memory 1424 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 1490 may be present that are internal and/or external to a housing of computing device 1402 and may or may not be removable. Examples of storage device 1490 include a hard disk drive, a SSD, a thumb drive (e.g., a USB (Universal Serial Bus) flash drive), or other physical storage device.

One or more programs may be stored in storage 1420. Such programs include operating system 1412, one or more application programs 1414, and other program modules and program data. Examples of such application programs may include, for example, computer program logic (e.g., computer program code/instructions) for implementing one or more of resource manager 108, monitoring and mitigation service 110, service provider activity monitor 116, mitigator 118, cluster 120A, cluster 120N, node 122A, node 122N, node 124A, node 124N, portal 206, admin portal 208, log analyzer 302, activity score determiner 304, activity analyzer 306, security alert generator 308, property set generator 802, score determiner 804, property set generator 1002, and/or score determiner 1104, along with any components and/or subcomponents thereof, as well as the flowcharts/flow diagrams (e.g., flowcharts 400, 500, 600, 700, 900, 1100, and/or 1200) described herein, including portions thereof, and/or further examples described herein.

Storage 1420 also stores data used and/or generated by operating system 1412 and application programs 1414 as application data 1416. Examples of application data 1416 include web pages, text, images, tables, sound files, video data, and other data, which may also be sent to and/or received from one or more network servers or other devices via one or more wired or wireless networks. Storage 1420 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 1402 through one or more input devices 1430 and may receive information from computing device 1402 through one or more output devices 1450. Input device(s) 1430 may include one or more of touch screen 1432, microphone 1434, camera 1436, physical keyboard 1438 and/or trackball 1440 and output device(s) 1450 may include one or more of speaker 1452 and display 1454. Each of input device(s) 1430 and output device(s) 1450 may be integral to computing device 1402 (e.g., built into a housing of computing device 1402) or external to computing device 1402 (e.g., communicatively coupled wired or wirelessly to computing device 1402 via wired interface(s) 1480 and/or wireless modem(s) 1460). Further input devices 1430 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1454 may display information, as well as operating as touch screen 1432 by receiving user commands and/or other information (e.g., by touch, finger gestures, virtual keyboard, etc.) as a user interface. Any number of each type of input device(s) 1430 and output device(s) 1450 may be present, including multiple microphones 1434, multiple cameras 1436, multiple speakers 1452, and/or multiple displays 1454.

One or more wireless modems 1460 can be coupled to antenna(s) (not shown) of computing device 1402 and can support two-way communications between processor 1410 and devices external to computing device 1402 through network 1404, as would be understood to persons skilled in the relevant art(s). Wireless modem 1460 is shown generically and can include a cellular modem 1466 for communicating with one or more cellular networks, such as a GSM network for data and voice communications within a single cellular network, between cellular networks, or between the mobile device and a public switched telephone network (PSTN). Wireless modem 1460 may also or alternatively include other radio-based modem types, such as a Bluetooth modem 1464 (also referred to as a "Bluetooth device") and/or Wi-Fi 1462 modem (also referred to as an "wireless adaptor"). Wi-Fi modem 1462 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1464 is configured to communicate with another Bluetooth-capable device according to the Bluetooth short-range wireless technology standard(s) such as IEEE 802.15.1 and/or managed by the Bluetooth Special Interest Group (SIG).

Computing device 1402 can further include power supply 1482, LI receiver 1484, accelerometer 1486, and/or one or more wired interfaces 1480. Example wired interfaces 1480 include a USB port, IEEE 1494 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 1480 of computing device 1402 provide for wired connections between computing device 1402 and network 1404, or between computing device 1402 and one or more devices/peripherals when such devices/peripherals are external to computing device 1402 (e.g., a pointing device, display 1454, speaker 1452, camera 1436, physical keyboard 1438, etc.). Power supply 1482 is configured to supply power to each of the components of computing device 1402 and may receive power from a battery internal to computing device 1402, and/or from a power cord plugged into a power port of computing device 1402 (e.g., a USB port, an A/C power port). LI receiver 1484 may be used for location determination of computing device 1402 and may include a satellite navigation receiver such as a Global Positioning System (GPS) receiver or may include other type of location determiner configured to determine location of computing device 1402 based on received information (e.g., using cell tower triangulation, etc.). Accelerometer 1486 may be present to determine an orientation of computing device 1402.

Note that the illustrated components of computing device 1402 are not required or all-inclusive, and fewer or greater numbers of components may be present as would be recognized by one skilled in the art. For example, computing device 1402 may also include one or more of a gyroscope, barometer, proximity sensor, ambient light sensor, digital compass, etc. Processor 1410 and memory 1456 may be co-located in a same semiconductor device package, such as being included together in an integrated circuit chip, FPGA, or system-on-chip (SOC), optionally along with further components of computing device 1402.

In embodiments, computing device 1402 is configured to implement any of the above-described features of flowcharts herein. Computer program logic for performing any of the operations, steps, and/or functions described herein may be stored in storage 1420 and executed by processor 1410.

In some embodiments, server infrastructure 1470 may be present in computing environment 1400 and may be communicatively coupled with computing device 1402 via network 1404. Server infrastructure 1470, when present, may be a network-accessible server set (e.g., a cloud-based environment or platform). As shown in FIG. 14, server infrastructure 1470 includes clusters 1472. Each of clusters 1472 may comprise a group of one or more compute nodes and/or a group of one or more storage nodes. For example, as shown in FIG. 14, cluster 1472 includes nodes 1474. Each of nodes 1474 are accessible via network 1404 (e.g., in a "cloud-based" embodiment) to build, deploy, and manage applications and services. Any of nodes 1474 may be a storage node that comprises a plurality of physical storage disks, SSDs, and/or other physical storage devices that are accessible via network 1404 and are configured to store data associated with the applications and services managed by nodes 1474. For example, as shown in FIG. 14, nodes 1474 may store application data 1478.

Each of nodes 1474 may, as a compute node, comprise one or more server computers, server systems, and/or computing devices. For instance, a node 1474 may include one or more of the components of computing device 1402 disclosed herein. Each of nodes 1474 may be configured to execute one or more software applications (or "applications") and/or services and/or manage hardware resources (e.g., processors, memory, etc.), which may be utilized by users (e.g., customers) of the network-accessible server set. For example, as shown in FIG. 14, nodes 1474 may operate application programs 1476. In an implementation, a node of nodes 1474 may operate or comprise one or more virtual machines, with each virtual machine emulating a system architecture (e.g., an operating system), in an isolated manner, upon which applications such as application programs 1476 may be executed.

In an embodiment, one or more of clusters 1472 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 1472 may be a datacenter in a distributed collection of datacenters. In embodiments, exemplary computing environment 1400 comprises part of a cloud-based platform such as Amazon Web Services® of Amazon Web Services, Inc., or Google Cloud Platform™ of Google LLC, although these are only examples and are not intended to be limiting.

In an embodiment, computing device 1402 may access application programs 1476 for execution in any manner, such as by a client application and/or a browser at computing device 1402. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 1402 may additionally and/or alternatively synchronize copies of application programs 1414 and/or application data 1416 to be stored at network-based server infrastructure 1470 as application programs 1476 and/or application data 1478. For instance, operating system 1412 and/or application programs 1414 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 1420 at network-based server infrastructure 1470.

In some embodiments, on-premises servers 1492 may be present in computing environment 1400 and may be communicatively coupled with computing device 1402 via network 1404. On-premises servers 1492, when present, are hosted within an organization's infrastructure and, in many cases, physically onsite of a facility of that organization. On-premises servers 1492 are controlled, administered, and maintained by IT (Information Technology) personnel of the organization or an IT partner to the organization. Application data 1498 may be shared by on-premises servers 1492 between computing devices of the organization, including computing device 1402 (when part of an organization) through a local network of the organization, and/or through further networks accessible to the organization (including the Internet). Furthermore, on-premises servers 1492 may serve applications such as application programs 1496 to the computing devices of the organization, including computing device 1402. Accordingly, on-premises servers 1492 may include storage 1494 (which includes one or more physical storage devices such as storage disks and/or SSDs) for storage of application programs 1496 and application data 1498 and may include one or more processors for execution of application programs 1496. Still further, computing device 1402 may be configured to synchronize copies of application programs 1414 and/or application data 1416 for backup storage at on-premises servers 1492 as application programs 1496 and/or application data 1498.

Embodiments described herein may be implemented in one or more of computing device 1402, network-based server infrastructure 1470, and on-premises servers 1492. For example, in some embodiments, computing device 1402 may be used to implement systems, clients, or devices, or components/subcomponents thereof, disclosed elsewhere herein. In other embodiments, a combination of computing device 1402, network-based server infrastructure 1470, and/or on-premises servers 1492 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk. SSD, other physical hardware media such as RAMs, ROMs, flash memory, digital video disks, zip disks, MEMs (microelectronic machine) memory, nanotechnology-based storage devices, and further types of physical/tangible hardware storage media of storage 1420. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 1414) may be stored in storage 1420. Such computer programs may also be received via wired interface(s) 1480 and/or wireless modem(s) 1460 over network 1404. Such computer programs, when executed or loaded by an application, enable computing device 1402 to implement features of embodiments discussed herein. Accordingly, such computer programs represent controllers of the computing device 1402.

Embodiments are also directed to computer program products comprising computer code or instructions stored on any computer-readable medium or computer-readable storage medium. Such computer program products include the physical storage of storage 1420 as well as further physical storage types.

V. Additional Example Embodiments

A computer-implemented method is described herein. The method includes: obtaining a first log that comprises a record of a first control plane operation executed on behalf of a first entity; identifying a service provider associated with the execution of the first control plane operation, the service provider having privileges to execute control plane operations on behalf of the first entity; determining, based at least on the service provider, a first malicious activity score indicative of a degree to which the first control plane operation is anomalous with respect to the first entity; determining, based at least on the determined first malicious activity score, the first control plane operation potentially corresponds to malicious activity; and responsive to determining that the first control plane operation potentially corresponds to malicious activity, generating a security alert.

In one implementation of the foregoing method, the method further comprises mitigating the first control plane operation in response to said determining the first control plane operation potentially corresponds to malicious activity.

In one implementation of the foregoing method, said obtaining the first log comprises: obtaining a plurality of logs comprising the first log, each obtained log comprising a respective record of a respective control plane operation executed on behalf of the first entity; identifying logs of the plurality of logs that comprise records of control plane operations executed by a respective cloud application associated with the first entity; and generating a filtered set of logs by removing the identified logs from the plurality of logs, the filtered set of logs comprising the first log.

In one implementation of the foregoing method, said identifying a service provider comprises: identifying a service principle associated with a cloud application that executed the first control plane operation on behalf of the first entity; and determining the service principle is associated with the service provider.

In one implementation of the foregoing method, said determining the first malicious activity score comprises: generating a first property set based on the first log; and determining the first malicious activity score based at least on the first property set and the service provider.

In one implementation of the foregoing method, said determining the first malicious activity score based at least on the first property set and the service provider comprises: obtaining data indicative of a second control plane operation executed by a cloud application associated with the service provider and on behalf of the first entity, the second control plane operation executed prior to the first control plane operation; determining a second property set based at least on the obtained data; and determining the first malicious activity score based at least on the service provider, the first property set, and the second property set.

In one implementation of the foregoing method, the method further comprises: obtaining a second log that comprises a record of a second control plane operation executed by a cloud application associated with the service provider and on behalf of a second entity, and determining a second malicious activity score indicative of a degree to which the second control plane operation is anomalous with respect to the entity based at least on the service provider. Said determining the first control plane operation potentially corresponds to malicious activity comprises determining the first control plane operation potentially corresponds to malicious activity based at least on the first malicious activity score and the second malicious activity score.

In one implementation of the foregoing method, said determining the first control plane operation potentially corresponds to malicious activity further comprises: identifying a pattern of a type of control plane operation based on a type of the first control plane operation and a type of the second control plane operation.

A system is described herein. The system comprises a processor circuit and a memory. The memory stores program code that is executable by the processor circuit to perform operations. The operations comprise obtaining a first log that comprises a record of a first control plane operation executed on behalf of a first entity. The operations further comprise identifying a service provider associated with the execution of the first control plane operation. The service provider has privileges to execute control plane operations on behalf of the first entity. The operations further comprise determining, based at least on the service provider, a first malicious activity score indicative of a degree to which the first control plane operation is anomalous with respect to the first entity. The operations further comprise determining, based at least on the determined first malicious activity score, the first control plane operation potentially corresponds to malicious activity. The operations further comprise, responsive to determining that the first control plane operation potentially corresponds to malicious activity, generating a security alert.

In one implementation of the forgoing system, the operations further comprise: mitigating the first control plane operation in response to said determining the first control plane operation potentially corresponds to malicious activity.

In one implementation of the forgoing system, said obtaining the first log comprises: obtaining a plurality of logs comprising the first log, each obtained log comprising a respective record of a respective control plane operation executed on behalf of the first entity; identifying logs of the plurality of logs that comprise records of control plane operations executed by a respective cloud application associated with the first entity; and generating a filtered set of logs by removing the identified logs from the plurality of logs, the filtered set of logs comprising the first log.

In one implementation of the forgoing system, said identifying a service provider comprises: identifying a service principle associated with a cloud application that executed the first control plane operation on behalf of the first entity; and determining the service principle is associated with the service provider.

In one implementation of the forgoing system, said determining the first malicious activity score comprises: generating a first property set based on the first log; and determining the first malicious activity score based at least on the first property set and the service provider.

In one implementation of the forgoing system, said determining the first malicious activity score based at least on the first property set and the service provider comprises: obtaining data indicative of a second control plane operation executed by a cloud application associated with the service provider and on behalf of the first entity, the second control plane operation executed prior to the first control plane operation; determining a second property set based at least on the obtained data; and determining the first malicious activity score based at least on the service provider, the first property set, and the second property set.

In one implementation of the forgoing system, said operations further comprise; obtaining a second log that comprises a record of a second control plane operation executed by a cloud application associated with the service provider and on behalf of a second entity, and determining a second malicious activity score indicative of a degree to which the second control plane operation is anomalous with respect to the entity based at least on the service provider. Said determining the first control plane operation potentially corresponds to malicious activity comprises determining the first control plane operation potentially corresponds to malicious activity based at least on the first malicious activity score and the second malicious activity score.

In one implementation of the forgoing system, said determining the first control plane operation potentially corresponds to malicious activity further comprises identifying a pattern of a type of control plane operation based on a type of the first control plane operation and a type of the second control plane operation.

A computer-readable storage medium is described herein. The computer-readable storage medium is encoded with program instructions that, when executed by one or more processors, perform a method. The method comprises: obtaining a first log that comprises a record of a first control plane operation executed on behalf of a first entity; identifying a service provider associated with the execution of the first control plane operation, the service provider having privileges to execute control plane operations on behalf of the first entity; determining, based at least on the service provider, a first malicious activity score indicative of a degree to which the first control plane operation is anomalous with respect to the first entity; determining, based at least on the determined first malicious activity score, the first control plane operation potentially corresponds to malicious activity; and responsive to determining that the first control plane operation potentially corresponds to malicious activity, generating a security alert.

In one implementation of the foregoing computer-readable storage medium, the method further comprises mitigating the first control plane operation in response to said determining the first control plane operation potentially corresponds to malicious activity.

In one implementation of the foregoing computer-readable storage medium, said obtaining the first log comprises: obtaining a plurality of logs comprising the first log, each obtained log comprising a respective record of a respective control plane operation executed on behalf of the first entity; identifying logs of the plurality of logs that comprise records of control plane operations executed by a respective cloud application associated with the first entity; and generating a filtered set of logs by removing the identified logs from the plurality of logs, the filtered set of logs comprising the first log.

In one implementation of the foregoing computer-readable storage medium, said identifying a service provider comprises: identifying a service principle associated with a cloud application that executed the first control plane operation on behalf of the first entity; and determining the service principle is associated with the service provider.

In one implementation of the foregoing computer-readable storage medium, said determining the first malicious activity score comprises: generating a first property set based on the first log; and determining the first malicious activity score based at least on the first property set and the service provider.

In one implementation of the foregoing computer-readable storage medium, said determining the first malicious activity score based at least on the first property set and the service provider comprises: obtaining data indicative of a second control plane operation executed by a cloud application associated with the service provider and on behalf of the first entity, the second control plane operation executed prior to the first control plane operation; determining a second property set based at least on the obtained data; and determining the first malicious activity score based at least on the service provider, the first property set, and the second property set.

In one implementation of the foregoing computer-readable storage medium, the method further comprises: obtaining a second log that comprises a record of a second control plane operation executed by a cloud application associated with the service provider and on behalf of a second entity, and determining a second malicious activity score indicative of a degree to which the second control plane operation is anomalous with respect to the entity based at least on the service provider. Said determining the first control plane operation potentially corresponds to malicious activity comprises determining the first control plane operation potentially corresponds to malicious activity based at least on the first malicious activity score and the second malicious activity score.

In one implementation of the foregoing computer-readable storage medium, said determining the first control plane operation potentially corresponds to malicious activity further comprises: identifying a pattern of a type of control plane operation based on a type of the first control plane operation and a type of the second control plane operation.

VI. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Several types of impactful operations have been described herein; however, lists of impactful operations may include other operations, such as, but not limited to: accessing enablement operations; creating and/or activating new (or previously-used) user accounts and/or service provider accounts; creating and/or activating new subscriptions; changing attributes of a user, user group, and/or service provider; changing multi-factor authentication settings; modifying federation settings; changing data protection (e.g., encryption) settings; elevating another user account's privileges (e.g., via an admin account or service provider account); retriggering guest invitation e-mails; and/or other operations that impact the cloud-based system, an application associated with the cloud-based system, and/or a user (e.g., a user account, a service provider account, etc.) associated with the cloud-based system.

Moreover, according to the described embodiments and techniques, any components of systems, computing devices, servers, device management services, virtual machine provisioners, applications, and/or data stores and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A method comprising:

obtaining a first log that comprises a record of a first control plane operation executed on behalf of a first entity;

identifying a service provider associated with the execution of the first control plane operation, the service provider having privileges to execute control plane operations on behalf of the first entity;

determining, based at least on a comparison of the execution of the first control plane operation and historic activity of the service provider, a first malicious activity score indicative of a degree to which the first control plane operation is anomalous with respect to the first entity;

determining, based at least on the determined first malicious activity score, the first control plane operation potentially corresponds to malicious activity; and responsive to determining that the first control plane operation potentially corresponds to malicious activity, generating a security alert.

2. The method of claim 1, further comprising:

mitigating the first control plane operation in response to said determining the first control plane operation potentially corresponds to malicious activity.

3. The method of claim 1, wherein said identifying a service provider comprises:

identifying a service principle associated with a cloud application that executed the first control plane operation on behalf of the first entity; and determining the service principle is associated with the service provider.

4. The method of claim 1, wherein said determining the first malicious activity score comprises:

generating a first property set based on the first log; and determining the first malicious activity score based at least on the first property set and the service provider.

5. The method of claim 4, wherein said determining the first malicious activity score based at least on the first property set and the service provider comprises:

obtaining data indicative of a second control plane operation executed by a cloud application associated with the service provider and on behalf of the first entity, the second control plane operation executed prior to the first control plane operation;

determining a second property set based at least on the obtained data; and determining the first malicious activity score based at least on the service provider, the first property set, and the second property set.

6. The method of claim 1, further comprising obtaining a second log that comprises a record of a second control plane operation executed by a cloud application associated with the service provider and on behalf of a second entity, and determining a second malicious activity score indicative of a degree to which the second control plane operation is anomalous with respect to the second entity based at least on the service provider; and wherein said determining the first control plane operation potentially corresponds to malicious activity comprises:

determining the first control plane operation potentially corresponds to malicious activity based at least on the first malicious activity score and the second malicious activity score.

7. The method of claim 6, wherein said determining the first control plane operation potentially corresponds to malicious activity further comprises:

identifying a pattern of a type of control plane operation based on a type of the first control plane operation and a type of the second control plane operation.

8. A method of comprising:

obtaining a plurality of logs, the obtained logs comprising respective records of respective control plane operations executed on behalf of a first entity;

identifying logs of the plurality of logs that comprise records of control plane operations executed by a respective cloud application associated with the first entity;

generating a filtered set of logs by removing the identified logs from the plurality of logs, the filtered set of logs comprising a first log comprising a record of a first control plane operation executed on behalf of a first entity;

identifying a service provider associated with the execution of the first control plane operation, the service provider having privileges to execute control plane operations on behalf of the first entity;

determining, based at least on the service provider, a first malicious activity score indicative of a degree to which the first control plane operation is anomalous with respect to the first entity;

determining, based at least on the determined first malicious activity score, the first control plane operation potentially corresponds to malicious activity; and responsive to determining that the first control plane operation potentially corresponds to malicious activity, generating a security alert.

9. A system, comprising:

a processor circuit; and a memory that stores program code that is executable by the processor circuit to perform operations, the operations comprising:

obtaining a first log that comprises a record of a first control plane operation executed on behalf of a first entity;

identifying a service provider associated with the execution of the first control plane operation, the service provider having privileges to execute control plane operations on behalf of the first entity;

determining, based at least on the service provider, a first malicious activity score indicative of a degree to which the first control plane operation is anomalous with respect to the first entity;

determining a second malicious activity score indicative of a degree to which a second control plane operation is anomalous with respect to a second entity, the second control plane operation executed by a cloud application associated with the service provider and on behalf of the second entity;

determining, based at least on the first malicious activity score and the second malicious activity score, the first control plane operation potentially corresponds to malicious activity; and responsive to determining that the first control plane operation potentially corresponds to malicious activity, generating a security alert.

10. The system of claim 9, wherein the operations further comprise:

mitigating the first control plane operation in response to said determining the first control plane operation potentially corresponds to malicious activity.

11. The system of claim 9, wherein said obtaining the first log comprises:

obtaining a plurality of logs comprising the first log, each obtained log comprising a respective record of a respective control plane operation executed on behalf of the first entity;

identifying logs of the plurality of logs that comprise records of control plane operations executed by a respective cloud application associated with the first entity; and generating a filtered set of logs by removing the identified logs from the plurality of logs, the filtered set of logs comprising the first log.

12. The system of claim 9, wherein said identifying a service provider comprises:

identifying a service principle associated with a cloud application that executed the first control plane operation on behalf of the first entity; and determining the service principle is associated with the service provider.

13. The system of claim 9, wherein said determining the first malicious activity score comprises:

generating a first property set based on the first log; and determining the first malicious activity score based at least on the first property set and the service provider.

14. The system of claim 13, wherein said determining the first malicious activity score based at least on the first property set and the service provider comprises:

obtaining data indicative of a third control plane operation executed by the cloud application associated with the service provider and on behalf of the first entity, the third control plane operation executed prior to the first control plane operation;

determining a second property set based at least on the obtained data; and determining the first malicious activity score based at least on the service provider, the first property set, and the second property set.

15. The system of claim 9, wherein:

said determining the second malicious activity score further comprises:

obtaining a second log that comprises a record of the second control plane operation, and determining the second malicious activity score based at least on the service provider.

16. The system of claim 15, wherein said determining the first control plane operation potentially corresponds to malicious activity further comprises:

identifying a pattern of a type of control plane operation based on a type of the first control plane operation and a type of the second control plane operation.

17. A computer-readable storage medium encoded with program instructions that, when executed by one or more processors, performs a method, the method comprising:

obtaining a first log that comprises a record of a first control plane operation executed on behalf of a first entity;

identifying a service provider associated with the execution of the first control plane operation, the service provider having privileges to execute control plane operations on behalf of the first entity;

obtaining data indicative of a second control plane operation executed by a first cloud application associated with the service provider and on behalf of the first entity, the second control plane operation executed prior to the first control plane operation;

determining, based at least on the service provider and the obtained data, a first malicious activity score indicative of a degree to which the first control plane operation is anomalous with respect to the first entity;

determining, based at least on the determined first malicious activity score, the first control plane operation potentially corresponds to malicious activity; and responsive to determining that the first control plane operation potentially corresponds to malicious activity, generating a security alert.

18. The computer-readable storage medium of claim 17, wherein said obtaining the first log comprises:

obtaining a plurality of logs comprising the first log, each obtained log comprising a respective record of a respective control plane operation executed on behalf of the first entity;

identifying logs of the plurality of logs that comprise records of control plane operations executed by a respective cloud application associated with the first entity; and generating a filtered set of logs by removing the identified logs from the plurality of logs, the filtered set of logs comprising the first log.

19. The computer-readable storage medium of claim 17, wherein said determining the first malicious activity score comprises:

generating a first property set based on the first log;

determining a second property set based at least on the obtained data; and determining the first malicious activity score based at least on the service provider, the first property set, and the second property set.

20. The computer-readable storage medium of claim 17, wherein:

said operations further comprise:

obtaining a second log that comprises a record of a third control plane operation executed by a second cloud application associated with the service provider and on behalf of a second entity, and determining a second malicious activity score indicative of a degree to which the third control plane operation is anomalous with respect to the second entity based at least on the service provider; and wherein said determining the first control plane operation potentially corresponds to malicious activity comprises:

determining the first control plane operation potentially corresponds to malicious activity based at least on the first malicious activity score and the second malicious activity score.

* * * * *